United States Patent
Ogura

(10) Patent No.: US 10,336,094 B2
(45) Date of Patent: Jul. 2, 2019

(54) INKJET PRINTER

(71) Applicant: Roland DG Corporation, Hamamatsu-shi, Shizuoka (JP)

(72) Inventor: Yoshinari Ogura, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 0 days.

(21) Appl. No.: 15/953,613

(22) Filed: Apr. 16, 2018

(65) Prior Publication Data

US 2018/0297372 A1    Oct. 18, 2018

(30) Foreign Application Priority Data

Apr. 18, 2017  (JP) .................. 2017-082147

(51) Int. Cl.
| | | |
|---|---|---|
| *B41J 2/21* | (2006.01) | |
| *B41J 2/14* | (2006.01) | |
| *B41J 2/155* | (2006.01) | |
| *H04N 1/60* | (2006.01) | |
| *B41J 11/00* | (2006.01) | |

(52) U.S. Cl.
CPC ......... *B41J 2/2135* (2013.01); *B41J 2/14201* (2013.01); *B41J 2/155* (2013.01); *B41J 2/2117* (2013.01); *B41J 2/2146* (2013.01); *H04N 1/60* (2013.01); *B41J 2/2121* (2013.01); *B41J 11/002* (2013.01)

(58) Field of Classification Search
CPC ........ B41J 2/2135; B41J 2/2146; B41J 2/155; B41J 2/2117; B41J 2/14201; B41J 2/2121; B41J 11/002; H04N 1/60
See application file for complete search history.

(56) References Cited

U.S. PATENT DOCUMENTS

| | | | | |
|---|---|---|---|---|
| 8,393,700 B2* | 3/2013 | Otsuka | ................. | B41J 11/002 347/101 |
| 8,424,993 B2* | 4/2013 | Ikehata | ................. | B41J 2/2114 347/101 |
| 8,662,637 B2* | 3/2014 | Ishimoto | ............... | B41J 2/2117 347/12 |
| 8,888,270 B2* | 11/2014 | Kachi | ................. | B41J 11/002 347/102 |

(Continued)

FOREIGN PATENT DOCUMENTS

| | | |
|---|---|---|
| JP | 07-040539 A | 2/1995 |
| JP | 2011-073432 A | 4/2011 |

(Continued)

OTHER PUBLICATIONS

Yoshida, "Inkjet Printer and Printing Method", U.S. Appl. No. 15/953,610, filed Apr. 16, 2018.

(Continued)

*Primary Examiner* — Yaovi M Ameh
(74) *Attorney, Agent, or Firm* — Keating & Bennett, LLP

(57) ABSTRACT

An inkjet printer includes a first ink head to eject a first ink, and a second ink head to eject a second ink. A generator generates dot groups including at least a first dot group and a second dot group including ink dots of the second ink. The dot groups include all the ink dots of the second ink. A first printing controller forms, on a recording medium, a first printing layer of the first ink and the first dot group. A second printing controller forms a second printing layer of the second dot group, above or below the first printing layer.

13 Claims, 11 Drawing Sheets

(56) References Cited

U.S. PATENT DOCUMENTS

| | | | | |
|---|---|---|---|---|
| 2006/0170937 A1* | 8/2006 | Takahashi | ............... | B41J 2/2139 358/1.8 |
| 2007/0057986 A1* | 3/2007 | Arazaki | ................. | B41J 2/2135 347/15 |
| 2009/0244168 A1* | 10/2009 | Kakutani | ............... | B41J 2/2107 347/21 |
| 2010/0053247 A1* | 3/2010 | Kakutani | ............... | B41J 2/2107 347/12 |
| 2011/0058192 A1* | 3/2011 | Hatanaka | ................. | H04N 1/54 358/1.9 |
| 2012/0001973 A1* | 1/2012 | Sano | ...................... | B41J 2/2117 347/12 |
| 2013/0208035 A1* | 8/2013 | Okumura | ............... | B41J 2/195 347/7 |
| 2014/0340456 A1* | 11/2014 | Waschnig | ............ | B41M 7/0081 347/102 |
| 2015/0266298 A1* | 9/2015 | Kifuku | ................. | B41J 2/16508 347/9 |
| 2018/0297372 A1* | 10/2018 | Ogura | .................... | B41J 2/2135 |
| 2018/0316826 A1* | 11/2018 | Ogura | .................... | H04N 1/603 |
| 2018/0326722 A1* | 11/2018 | Ogura | ........................ | B41J 2/14 |

FOREIGN PATENT DOCUMENTS

| | | |
|---|---|---|
| JP | 2012-011752 A | 1/2012 |
| JP | 2013-067031 A | 4/2013 |
| JP | 2013-163343 A | 8/2013 |
| JP | 2016-076774 A | 5/2016 |

OTHER PUBLICATIONS

Yoshida, "Inkjet Printer", U.S. Appl. No. 15/953,611, filed Apr. 16, 2018.

* cited by examiner

INKJET PRINTER

CROSS REFERENCE TO RELATED APPLICATION

This application claims the benefit of priority to Japanese Patent Application No. 2017-082147 filed on Apr. 18, 2017. The entire contents of this application are hereby incorporated herein by reference.

BACKGROUND OF THE INVENTION

1. Field of the Invention

The present invention relates to an inkjet printer.

2. Description of the Related Art

Conventionally, an inkjet printer for large format printing that includes a plurality of recording heads arrayed in a direction perpendicular to a scanning direction of a head unit is known. The inkjet printer having such a structure performs printing on a large area of a recording medium within a short time. Japanese Laid-Open Patent Publication No. 2013-67031 discloses an inkjet recording device including nine head units corresponding to nine colors of ink arrayed in the scanning direction. The nine head units each include nine recording heads arrayed in a feeding direction perpendicular to the scanning direction.

Some of recording mediums such as cloth, paper and the like are not white. In the case in which process color ink is directly ejected onto such a non-white recording medium, the real color of the ink may not be provided. According to a technique for addressing this situation, a recording head ejecting white ink is added to the printer ejecting nine colors of ink as described in Japanese Laid-Open Patent Publication No. 2013-67031, so that the printer provides 10 colors of ink. With this technique, first, the white ink is used to form a white underlying color layer on a surface of the recording medium. After the white ink layer is formed on the recording medium, an image layer of process color ink is formed on the white ink layer. In this manner, a color close to the real color of the ink is printed even on a recording medium that is not white.

Usually, the above-described technique provides a sufficiently high level of image quality even on a recording medium that is not white. However, a still higher level of image quality may be desired for some uses of the printed item. In the field of, for example, outdoor advertisements or the like, there is a need for an image that provides a strong impression of having depth or massiveness in order to attract more attention. The human sense of vision perceives depth or thickness even on a two-dimensional image. However, often, the conventional printing method does not allow the human sense of vision to sufficiently exert this ability.

SUMMARY OF THE INVENTION

Preferred embodiments of the present invention provide inkjet printers that print images that appear to have depth or massiveness.

An inkjet printer according to a preferred embodiment of the present invention includes a first ink head including a plurality of nozzles through which a first ink is ejected towards a recording medium to form ink dots of the first ink on the recording medium; a second ink head including a plurality of nozzles through which a second ink is ejected towards the recording medium to form ink dots of the second ink on the recording medium; a moving mechanism moving the first ink head and the second ink head, and the recording medium, with respect to each other; and a controller connected with the first ink head, the second ink head and the moving mechanism to control the first ink head, the second ink head and the moving mechanism. The controller includes a generator, a first printing controller and a second printing controller. The generator generates, upon receipt of data on the ink dots of the second ink, a plurality of dot groups, including at least a first dot group and a second dot group, of the ink dots of the second ink. The generator generates the plurality of dot groups such that the plurality of dot groups include all of the ink dots of the second ink. The first printing controller forms, on the recording medium, a first printing layer of the ink dots of the first ink and the ink dots of the first dot group. The second printing controller forms a second printing layer of the ink dots of the second dot group, above or below the first printing layer.

According to the inkjet printer described above, the first ink and a portion of the second ink (first dot group) are concurrently printed to form the "first printing layer". Above or below the "first printing layer", another portion of the second ink (second dot group) is printed to form the "second printing layer". The second ink is printed to form an upper layer and a lower layer in an overlapping manner as described above, so that the physical thickness of the layer of the second ink is increased. Thus, an image appearing to be deeper and more massive than an image formed by the conventional printer is able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
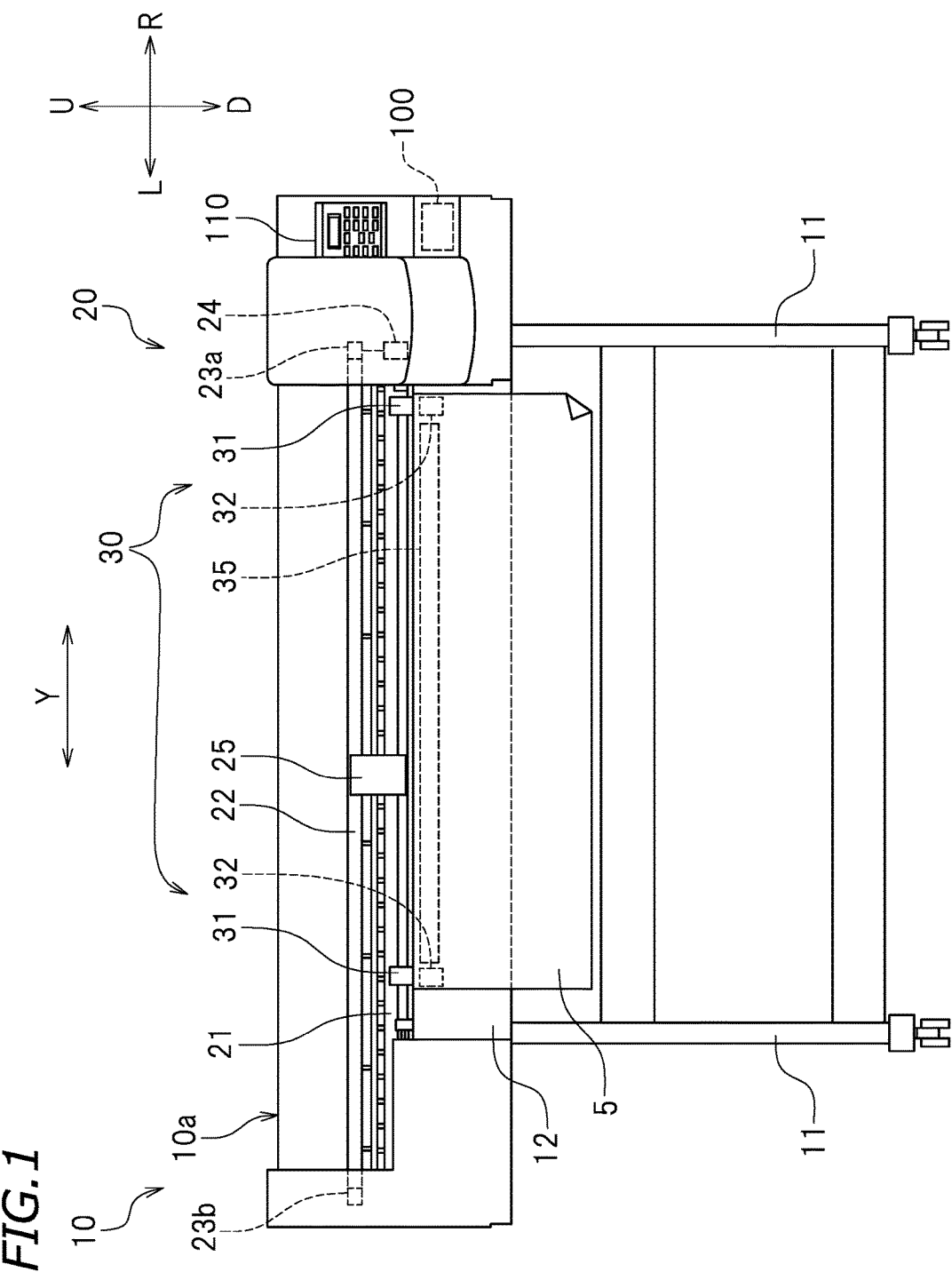
FIG. 1 is a front view of an inkjet printer according to preferred embodiment 1 of the present invention.

Hereinafter, preferred embodiments of inkjet printers according to the present invention will be described with reference to the drawings. The preferred embodiments described below are not intended to specifically limit the present invention. Components and portions that have the same functions will be denoted by the same reference signs, and overlapping descriptions will be omitted or simplified. In the following description, a direction from an inkjet printer towards a user facing a front surface of the inkjet printer is referred to as "forward", and a direction distanced from the user is referred to as "rearward". In the drawings, letter Y refers to a scanning direction, and letter X refers to a feeding direction perpendicular to the scanning direction. In the drawings, letters F, Rr, L, R, U and D respectively refer to "front", "rear", "left", "right", "up" and "down". These directions are also based on the user facing the front surface of the inkjet printer. It should be noted that these directions are provided merely for the sake of convenience, and do not limit the manner of installation of the inkjet printer in any way. The expression that one component is "above" (or "below") another component may refer to a state in which the one component is above (or below) the another component while being in direct contact with the another component, as well as a state in which the one component is above (or below) the another component while having still another component provided between the one component and the another component.

Preferred Embodiment 1

FIG. 1 is a front view of a large-scale inkjet printer (hereinafter, referred to a "printer") 10 according to preferred embodiment 1. The printer 10 sequentially moves a roll of recording medium 5 forward (toward a downstream side X2 in the feeding direction X), while ejecting ink from a first ink head 40 and a plurality of second ink heads 50 (see FIG. 2) mounted on a carriage 25 moving in the scanning direction Y, to print an image on the recording medium 5.

The recording medium 5 is a target on which an image is to be printed. There is no specific limitation on the type of the recording medium 5. The recording medium 5 may be, for example, paper such as plain paper, printing paper for an inkjet printer, or the like. The recording medium 5 may be a transparent sheet formed of a resin, glass or other suitable paper. The recording medium 5 may be a sheet formed of a metal material, rubber or the like. In the present preferred embodiment, the recording medium 5 is preferably a transparent sheet.

As shown in FIG. 1, the printer 10 includes a printer main body 10a and legs 11 supporting the printer main body 10a. The printer main body 10a extends in the scanning direction Y. The printer main body 10a includes a guide rail 21 and the carriage 25 engaged with the guide rail 21. The guide rail 21 extends in the scanning direction Y. The guide rail 21 guides the carriage 25 such that the carriage 25 moves in the scanning direction Y. An endless belt 22 is secured to the carriage 25. The belt 22 is wrapped around, and extends between, a pulley 23a provided at a right end of the guide rail 21 and a pulley 23b provided at a left end of the guide rail 21. A carriage motor 24 is attached to the right pulley 23a. The carriage motor 24 is electrically connected with a controller 100. The carriage motor 24 is controlled by the controller 100. When the carriage motor 24 is driven, the pulley 23a is rotated to run the belt 22. As a result, the carriage 25 moves in the scanning direction Y along the guide rail 21. Along with the movement of the carriage 25 in the scanning direction Y, the first ink head 40 and the second ink heads 50 also move in the scanning direction Y. In the present preferred embodiment, the belt 22, the pulley 23a, the pulley 23b and the carriage motor 24 are included in an example of carriage moving mechanism 20 moving the carriage 25, and the first ink head 40 and the second ink heads 50 mounted on the carriage 25, in the scanning direction Y. A platen 12 is located below the carriage 25. The platen 12 extends in the scanning direction Y. The recording medium 5 is to be placed on the platen 12. Pinch rollers 31 pressing the recording medium 5 from above are provided above the platen 12. The pinch rollers 31 are located to the rear of the carriage 25. The platen 12 is provided with grit rollers 32. The grit rollers 32 are located below the pinch rollers 31. The grit rollers 32 are located at a position facing the pinch rollers 31. The grit rollers 32 are coupled with a feed motor 33 (see FIG. 3). The grit rollers 32 are rotatable upon receipt of a driving force of the feed motor 33. The feed motor 33 is electrically connected with the controller 100. The feed motor 33 is controlled by the controller 100. When the grit rollers 32 are rotated in the state in which the recording medium 5 is held between the pinch rollers 31 and the grit rollers 32, the recording medium 5 is fed in the feeding direction X. In the present preferred embodiment, the pinch rollers 31, the grit rollers 32 and the feed motor 33 are included in an example of feeding mechanism 30 moving the recording medium 5 in the feeding direction X. The feeding mechanism 30 and the carriage moving mechanism 20 are included in a moving mechanism moving the recording medium 5 and the carriage 25 with respect to each other.

Figure 2:
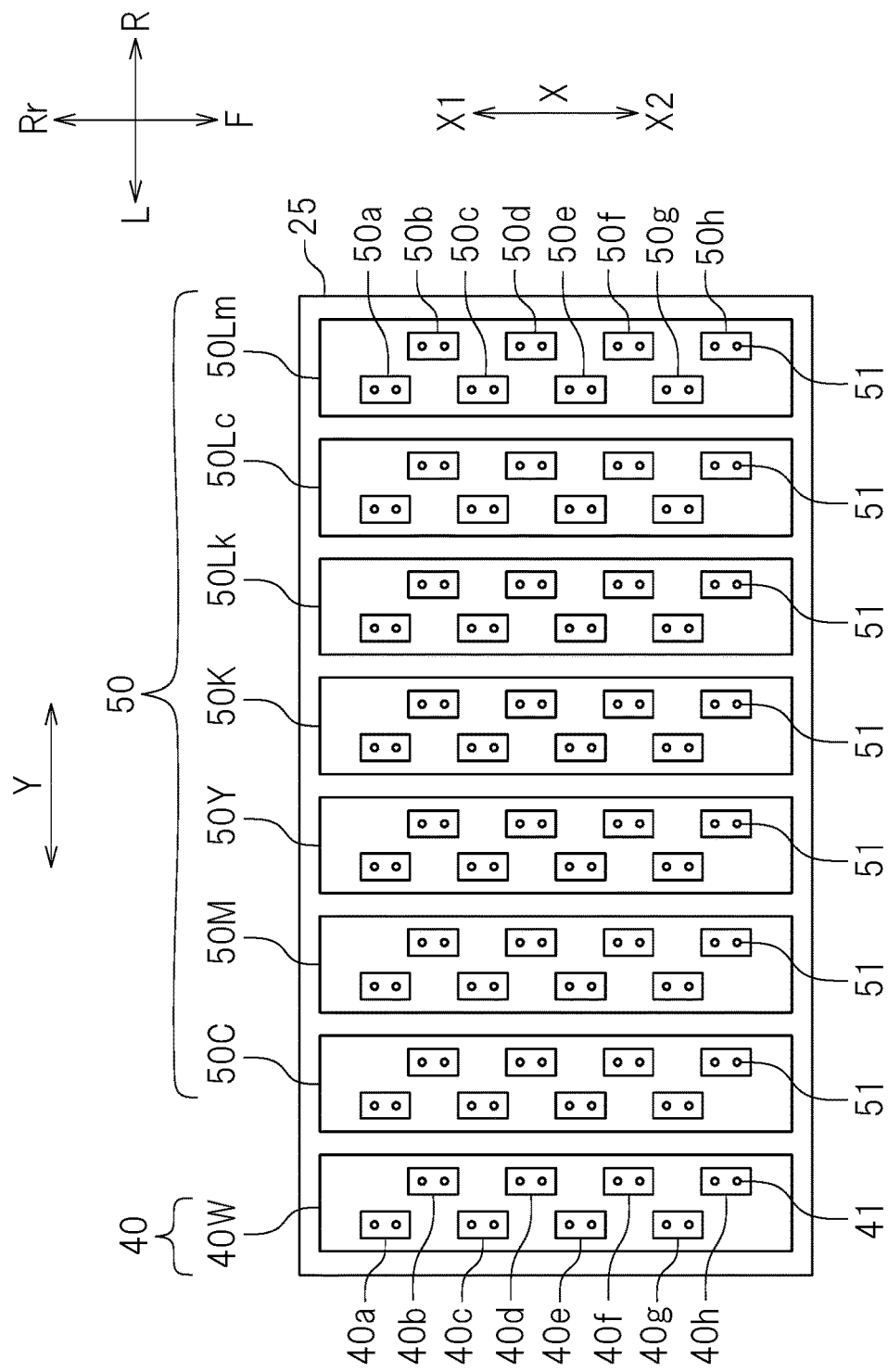
FIG. 2 is a schematic view showing a structure of a bottom surface of a carriage according to preferred embodiment 1 of the present invention.

FIG. 2 is a schematic view showing a structure of a surface of the carriage 25 that faces the recording medium 5 (in the present preferred embodiment, a bottom surface of the carriage 25). As shown in FIG. 2, the carriage 25 holds, at the bottom surface, the first ink head 40 and the second ink heads 50. The first ink head 40 includes one ink head 40W (the ink head 40W may also be referred to as the "first ink head 40W"). The plurality of second ink heads 50 include ink heads 50C, 50M, 50Y, 50K, 50Lk, 50Lc and 50Lm. As shown in FIG. 2, the first ink head 40W and the second ink heads 50C through 50Lm are located side by side in the scanning direction Y.

In the present preferred embodiment, the first ink head 40 ejects special color ink that changes the color tone or the design of a color image. The special color ink is an example of "first ink". In this example, the ink head 40W included in the first ink head 40 preferably ejects white ink. The color tone of the special color ink is not limited to white. The "special color ink" encompasses ink other than the process color ink such as C ink, M ink, Y ink, K ink or other process color inks, for example, metallic ink such as silver ink, gold ink or other metallic inks, and transparent ink, for example. In the present preferred embodiment, the first ink head 40 preferably includes one ink head, for example. The number of the ink head(s) included in the first ink head 40 is not limited to one. The number of the ink heads included in the first ink head 40 may be two or more. There is no limitation on the color tone of the special color ink. The first ink head 40 may eject, for example, metallic ink such as silver ink, gold ink or other metallic inks, or transparent ink.

As shown in FIG. 2, the ink head 40W included in the first ink head 40 preferably includes eight sub ink heads 40a through 40h, for example. The eight sub ink heads 40a through 40h each include a plurality of nozzles 41, through which the ink is ejected. The plurality of nozzles 41 are arrayed in one line in the feeding direction X in each sub ink head. The sub ink heads 40a through 40h include the same number of nozzles 41 with each other. The positional arrangement of the nozzles 41 in each sub ink head is not limited to the above-described positional arrangement. The sub ink heads 40a through 40h do not need to include the same number of nozzles 41 with each other. In FIG. 2, the sub ink heads 40a through 40h are each shown as including two nozzles 41. In actuality, the sub ink heads 40a through 40h each include a larger number of (e.g., 40) nozzles 41. There is no limitation on the number of the nozzles 41 included in the sub ink heads 40a through 40h.

In the ink head 40W, the eight sub ink heads 40a through 40h are preferably located in a staggered arrangement. More specifically, the eight sub ink heads 40a through 40h are arrayed in this order from an upstream side X1 in the feeding direction X towards the downstream side X2 and provided in two lines, namely, a left line and a right line. Among the eight sub ink heads 40a through 40h, the sub ink heads 40a, 40c, 40e and 40g are arrayed in one line in the feeding direction X. To the right of the sub ink heads 40a, 40c, 40e and 40g, the sub ink heads 40b, 40d, 40f and 40h are arrayed in one line in the feeding direction X. The sub ink heads 40a through 40h are located alternately in the left line and the right line. The sub ink heads 40a through 40h are located intermittently as described above, but are continuous in the feeding direction X if the left line and the right line are considered as being combined together. In an actual ink head, the sub ink heads may be located while overlapping each other partially in the feeding direction X such that the nozzles 41 are located continuously in the feeding direction X.

The ink heads 50C through 50Lm provided as the second ink heads 50 each eject process color ink usable to form a color image. The process color ink is an example of "second ink". In the present preferred embodiment, the ink head 50C ejects cyan ink. The ink head 50M ejects magenta ink. The ink head 50Y ejects yellow ink. The ink head 50K ejects black ink. The ink head 50Lk ejects gray ink. The ink head 50Lc ejects light cyan ink. The ink head 50Lm ejects light magenta ink. The number of the second ink heads is not limited to seven. There is no limitation on the color tone of the process color ink.

As shown in FIG. 2, the seven ink heads 50C, 50M, 50Y, 50K, 50Lk, 50Lc and 50Km provided as the second ink heads 50 each include eight sub ink heads 50a through 50h. The eight sub ink heads 50a through 50h each include a plurality of nozzles 51, through which the ink is ejected. The plurality of nozzles 51 are arrayed in one line in the feeding direction X in each sub ink head. The nozzles 51 in the ink heads 50C, 50M, 50Y, 50K, 50Lk, 50Lc and 50Lm are arrayed at positions matched, in the feeding direction X, to the positions of the nozzles 41 in the ink head 40W. The number of the nozzles 51 included in each of the sub ink heads 50a through 50h is preferably equal or substantially equal to the number of the nozzles 41 included in each of the sub ink heads 40a through 40h. The positional arrangement of the nozzles 51 in each sub ink head is not limited to the above-described positional arrangement. The sub ink heads 50a through 50h do not need to include the same number of nozzles 51 with each other.

In the seven ink heads 50C through 50Lm provided as the second ink heads 50 are arrayed in the same or substantially the same manner as in the first the ink head 40W. That is, the sub ink heads 50a through 50h are arrayed in this order from the upstream side X1 toward the downstream side X2 in the feeding direction X and are provided in two lines, that is, a left line and a right line. More specifically, the sub ink heads 50a, 50c, 50e and 50g are arrayed in the left line, and the sub ink heads 50b, 50d, 50f and 50h are arrayed in the right line. In the second ink heads 50 also, the sub ink heads 50a through 50h are located continuously in the feeding direction X if the left line and the right line are considered as being combined together.

The ink head 40W and the ink heads 50C through 50Lm each include actuators 45 (see FIG. 3, FIGS. 8A and 8B) provided therein. In the present preferred embodiment, the actuators 45 each includes a pressure chamber 45a and a piezoelectric element 45b. The ink is stored in the pressure chamber 45a, and one nozzle 41 is provided at a bottom surface of the pressure chamber 45a. The piezoelectric element 45b is provided in contact with the pressure chamber 45a, and is displaced to contract the pressure chamber 45a when being driven. The actuators 45 are electrically connected with the controller 100 (see FIG. 1). The actuators 45 are controlled by the controller 100. The actuators 45 are driven, and as a result, the ink is ejected towards the recording medium 5 from the nozzles 41 of the first ink head 40W and the nozzles 51 of the second ink heads 50.

The ink head 40W included in the first ink head 40 and the ink heads 50C through 50Lm provided as the second ink heads 50 are each in communication with an ink cartridge (not shown) via an ink supply path (not shown). The ink cartridge is detachably located at, for example, a right end of the printer main body 10a. There is no limitation on the material of the ink, and any of various materials conventionally used as an ink material for an inkjet printer is usable. The ink may preferably be, for example, solvent-based pigment ink or aqueous pigment ink. Alternatively, the ink may be aqueous dye ink, ultraviolet-curable pigment ink cured upon receipt of ultraviolet rays, or other suitable ink.

As shown in FIG. 1, the printer 10 includes a heater 35. The heater 35 is provided below the platen 12. The heater 35 is located towards the front of the grit rollers 32. The heater 35 heats the platen 12. The platen 12 is heated, so that the recording medium 5 placed on the platen 12 and the ink that has landed on the recording medium 5 are heated. Thus, the drying of the ink is promoted. The heater 35 is electrically connected with the controller 100. The temperature to which the heater 35 is heated is controlled by the controller 100.

Figure 3:
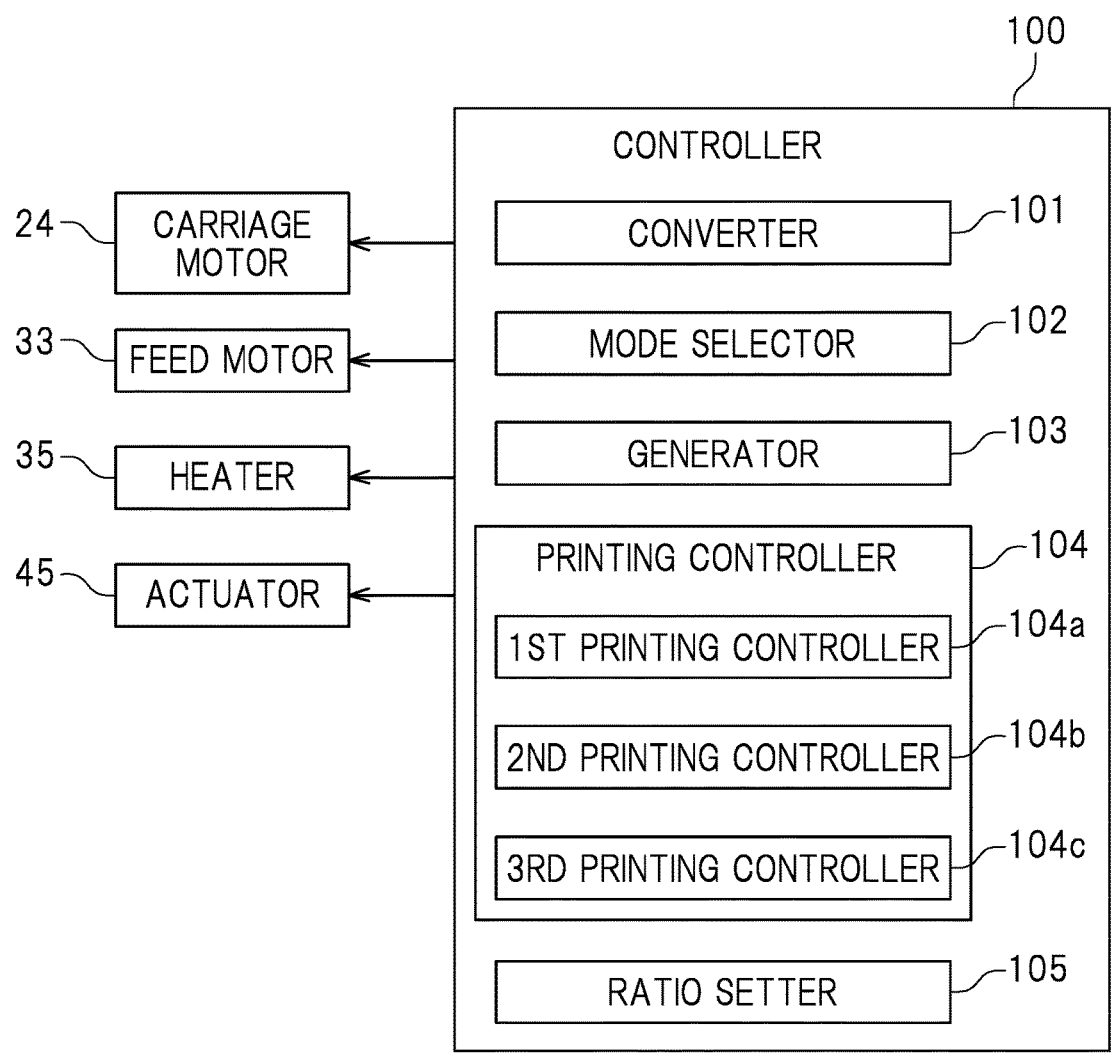
FIG. 3 is a block diagram of the printer.

As shown in FIG. 1, an operation panel 110 is provided at the right end of the printer main body 10a. The operation panel 110 includes a display that displays a state of the printer 10, input keys operable by the user, and other controls. The controller 100 is configured and/or programmed to control various operations of the printer 10 and is accommodated in the operation panel 110. FIG. 3 is a block diagram of the printer 10 according to the present preferred embodiment. As shown in FIG. 3, the controller 100 is communicably connected with, and is configured and/or programmed to control, the feed motor 33, the carriage motor 24, the heater 35, and the actuators 45 provided in the ink head 40W of the first ink head 40 and the ink heads 50C through 50Lm provided as the second ink heads 50. The controller 100 is configured and/or programmed to include a converter 101, a mode selector 102, a generator 103, a printing controller 104, and a ratio setter 105. The printing controller 104 includes a first printing controller 104a, a second printing controller 104b and a third printing controller 104c.

There is no specific limitation on the structure of the controller 100. The controller 100 is preferably, for example, a microcomputer. There is no specific limitation on the hardware structure of the microcomputer. The microcomputer includes, for example, an interface (I/F) receiving printing data or other data from an external device such as a host computer or other suitable device like, a central processing unit (CPU) executing a command of a control program, a ROM (read only memory) having, stored thereon, the program executable by the CPU, a RAM (random access memory) usable as a working area in which the program is developed, and a storage such as a memory or other suitable storage, storing the above-described program and various types of data. The controller 100 does not need to be provided inside the printer main body 10*a*. The controller 100 may be, for example, a computer that is located outside of the printer main body 10*a* and is communicably connected with the printer main body 10*a* in a wired or wireless manner.

The converter 101 converts so-called screen processing. The screen processing is a process of converting each of image data of special color ink and image data of process color ink into an ink dot pattern. A printed image formed by an inkjet printer is a combination of ink dots of various colors of process color ink. In the case of the printer 10 in the present preferred embodiment, the image is converted into an ink dot pattern of seven colors including cyan, magenta, yellow, black, gray, light cyan and light magenta, for example. The special color ink, which is white ink only in the present preferred embodiment, is also subjected to screen processing, namely, is converted into an ink dot pattern. The converter 101 may be included in the printer main body 10*a* or may be included in an external computer or the like.

The mode selector 102 is used to select a printing mode. In the present preferred embodiment, the printing mode is classified into "normal printing" and "overlapping printing". The "overlapping printing" is classified into "first overlapping printing" and "second overlapping printing". According to the "first overlapping printing", an underlying color layer is provided as a lower layer of the special color ink, and an image layer is provided as an upper layer of the process color ink. According to the "second overlapping printing", an image layer is provided as a lower layer of the process color ink, and an underlying color layer is provided as an upper layer of the special color ink. The "first overlapping printing" and the "second overlapping printing" will be described in detail below. When the "first overlapping printing" or the "second overlapping printing" is selected, the mode selector 102 instructs the first printing controller 104*a* and the second printing controller 104*b* to perform the selected overlapping printing. When the "normal printing" mode is selected, the mode selector 102 instructs the third printing controller 104*c* to perform the "normal printing". The printing mode may be incorporated in advance into the printing data and automatically selected. Alternatively, the printing mode may be selected appropriately by an operator.

The generator 103 generates a "first dot group" and a "second dot group" of the ink dots of the process color ink provided by the converter 101. The "first dot group" and the "second dot group" both include a portion of the ink dots of the process color ink. The "first dot group" and the "second dot group" are generated to match an entirety of the ink dots of the process color ink when being combined together. Namely, where the entirety of the ink dots of the process color ink is 100%, the sum of the "first dot group" and the "second dot group" is 100%. The relationship among the "first dot group", the "second dot group" and the entirety of the ink dots of the process color ink will be described in detail below. A method for generating the "first dot group" and the "second dot group" will be described in detail below.

The printing controller 104 controls the printing operation. The printing controller 104 is connected with the carriage motor 24, the feed motor 33, and the actuators 45 provided in the first ink head 40W and the second ink heads 50C through 50Lm. The printing controller 104 controls these components to perform printing. The printing controller 104 controls the temperature of the heater 35 to promote the drying of the ink after the ejection.

In the printing controller 104, the first printing controller 104*a* controls a concurrent printing operation of a work of printing an image of the "first dot group" and a work of printing an underlying color of the special color ink. Hereinafter, a printing layer provided by the above-described concurrent printing operation may be referred to as a "first printing layer". The "first printing layer" is an underlying color layer including a portion of an image including the process color ink mixed therein. The first printing controller 104*a* is connected with the carriage motor 24, the feed motor 33, and the actuators 45 provided in the first ink head 40W and the second ink heads 50C through 50Lm. The first printing controller 104*a* controls these components to form the "first printing layer". The first printing controller 104*a* controls these components in a different manner in accordance with which of the "first overlapping printing" and the "second overlapping printing" is selected by the mode selector 102. More specifically, when the "first overlapping printing" is selected by the mode selector 102, the first printing controller 104*a* controls the components such that the "first printing layer" is provided as the lower layer. By contrast, when the "second overlapping printing" is selected by the mode selector 102, the first printing controller 104*a* controls the components such that the "first printing layer" is provided as the upper layer. The details of the control will be described below.

In the printing controller 104, the second printing controller 104*b* controls a printing work of printing an image of the "second dot group". Hereinafter, a printing layer provided by such printing may be referred to as a "second printing layer". The "second printing layer" is an image layer. The "second printing layer" is provided by the second printing controller 104*b* above or below the "first printing layer". When the "first overlapping printing" is selected by the mode selector 102, the "second printing layer" is formed above the "first printing layer". By contrast, when the "second overlapping printing" is selected by the mode selector 102, the "second printing layer" is provided below the "first printing layer" before the "first printing layer" is formed. The second printing controller 104*b* is connected with the carriage motor 24, the feed motor 33, and the actuators 45 provided in the first ink head 40W and the second ink heads 50C through 50Lm. The second printing controller 104*b* controls these components to provide the "second printing layer". The details of the control will be described below.

When the "normal printing" is selected by the mode selector 102, the third printing controller 104*c* controls the carriage motor 24, the feed motor 33, and the actuators 45 provided in the second ink heads 50C through 50Lm to perform the "normal printing" on the recording medium 5. A process of the "normal printing" will be described below.

The ratio setter 105 sets the ratio of the "first dot group" and the ratio of the "second dot group" with respect to the entirety of the ink dots of the process color ink. Hereinafter, the ratio of the "first dot group" with respect to the entirety of the ink dots of the process color ink may be referred to as a "first printing ratio", and the ratio of the "second dot group" with respect to the entirety of the ink dots of the process color ink may be referred to as a "second printing ratio". The ratio setter 105 supplies the "first printing ratio" and the "second printing ratio" to the generator 103 as the conditions under which the "first dot group" and the "second dot group" are to be generated. The ratio setter 105 will be described in detail below.

According to the "normal printing", one layer is printed on the recording medium 5. For the "normal printing", only the process color ink is used. In the "normal printing", the entirety of the ink dots of the process color ink generated by the converter 101 is formed on the recording medium 5. The "normal printing" is performed as follows. The third printing controller 104c drives the carriage motor 24 to move the carriage 25 in the scanning direction Y. The third printing controller 104c drives the actuators 45 to cause the second ink heads 50 to eject the ink, so that the process color ink lands on a printing surface of the recording medium 5. In addition, the third printing controller 104c controls the feed motor 33 such that the recording medium 5 is sequentially fed forward (F) (towards the downstream side X2 in the feeding direction X). The ink on the recording medium 5 fed by the feed motor 33 is sequentially heated by the heater 35 and thus is dried. The third printing controller 104c, for example, moves the carriage 25 in the scanning direction Y once or a plurality of times by the time when the recording medium 5 is fed forward (F) once.

In the overlapping printing modes including the "first overlapping printing" mode and the "second overlapping printing" mode, an underlying color layer and an image layer are formed in an overlapping manner on the recording medium 5. In the case in which the recording medium 5 is not white as in the present preferred embodiment (in the present preferred embodiment, the recording medium 5 is preferably transparent), such overlapping printing is often performed on a recording medium. Often, the process color ink ejected directly onto a recording medium that is not white does not develop the real color thereof. Therefore, first, a white ink layer is printed on the recording medium, and then, an image is printed on the white ink layer. In this manner, a color close to the real color of the ink is printed even on a recording medium that is not white. The overlapping printing is also performed in a case other than the above-described case. For example, a special color ink layer of transparent ink, metallic ink or other suitable ink may be provided above or below the image, so that a specific visual effect is provided. In the case in which the recording medium 5 is a transparent sheet as in the present preferred embodiment, the overlapping printing is performed primarily to provide the image with an underlying color (in the present preferred embodiment, preferably white). For a printed item, a printing surface of which is to be viewed, the special color ink layer is preferably provided below the image. For forming a printed item, a surface opposite to the printing surface of which is to be viewed, the special color ink layer is preferably provided above the image.

For the overlapping printing, there are needs for a higher image quality. In the field of, for example, outdoor advertisements, there is a need for an image providing a strong impression of having depth and/or massiveness in order to attract more attention.

In order to fulfill such a need, the printer 10 in the present preferred embodiment includes the generator 103, the first printing controller 104a and the second printing controller 104b, and is configured such that a portion of the image is printed as being mixed in the underlying color layer. Upon receipt of data on the ink dots of the process color ink, the generator 103 generates the "first dot group" and the "second dot group" of the ink dots of the process color ink. In this step, the "first dot group" and the "second dot group" are generated such that a sum thereof matches the entirety of the ink dots of the process color ink. The first printing controller 104a provides the "first printing layer", on the recording medium 5, of the ink dots of the special color ink and the ink dots of the "first dot group". The expression that the "first printing layer" is provided "on" the recording medium 5 does not necessarily indicate that the "first printing layer" is provided in contact with the recording medium 5, and encompasses a case in which another printing layer (e.g., "second printing layer") is provided between the "first printing layer" and the recording medium 5. The second printing controller 104b provides the "second printing layer" of the ink dots of the "second dot group", above or below the "first printing layer". In the case in which the "first printing layer" is provided as the lower layer whereas the "second printing layer" is provided as the upper layer, the "first overlapping printing" has been selected. In the case in which the "second printing layer" is provided as the lower layer whereas the "first printing layer" is provided as the upper layer, the "second overlapping printing" has been selected.

The printer 10 according to the present preferred embodiment prints the underlying color layer having a portion of the image of the process color ink mixed therein (first printing layer). In the case in which a portion of the image is mixed in the underlying color layer in this manner, the thickness of the image layer is physically increased, and thus an image appearing to be deeper and more massive than an image formed by overlapping printing performed by the conventional printer is able to be provided.

In the case in which the recording medium is transparent, the image of the printed item provided by the printer 10 according to the present preferred embodiment is visually recognizable also from the side of the underlying color layer. In the case in which the printing is performed on a transparent recording medium with the conventional overlapping printing, the level of the light blocking property of the underlying color layer is increased in order to provide a clear image. That is, the underlying color layer is thick or has a high density. However, in the state in which the level of the light blocking property of the underlying color layer is increased, the image is not visually recognizable from the side of the underlying color layer. This may cause a problem in position alignment in, for example, a bonding process in which a plurality of recording mediums need to be positionally aligned. The printer 10 according to the present preferred embodiment is able to provide a printed item allowing the image to be visually recognizable from the side of the underlying color layer while the level of the light blocking property of the underlying color layer is maintained high.

Hereinafter, a process of generating the "first dot group" and the "second dot group" and a process of "overlapping printing" performed by the printer 10 according to the present preferred embodiment will be described. First, a process of generating the "first dot group" and the "second dot group" of the ink dots of the process color ink will be described.

Figure 4:
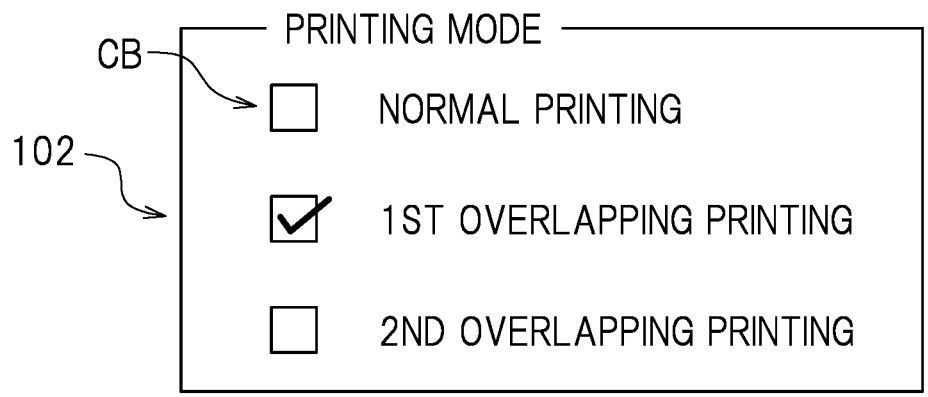
FIG. 4 shows an example of interfaces of a mode selector and a ratio setter.
Figure 4:
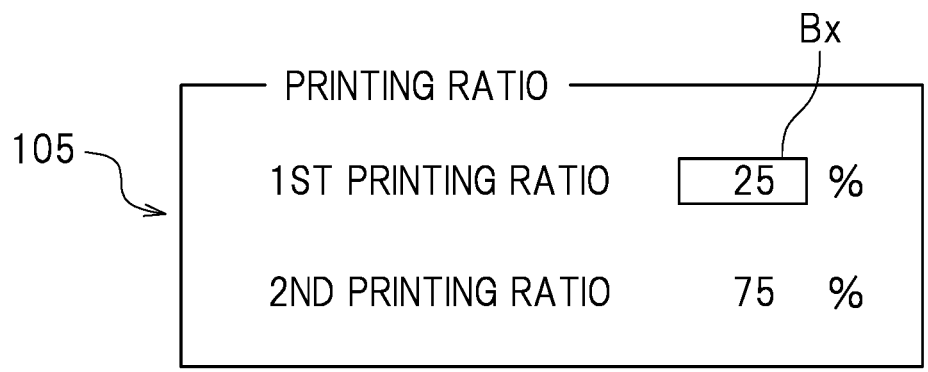

FIG. 4 shows an example of interfaces of the mode selector 102 and the ratio setter 105. The interfaces of the mode selector 102 and the ratio setter 105 are displayed on, for example, a display of a computer. As shown in FIG. 4, the interfaces include the check boxes CB usable to select the printing mode and an input box Bx to which the "first printing ratio" may be input. The check boxes CB are the interfaces by which information may be input to the mode selector 102. The input box Bx is an interface to which information may be input to the ratio setter 105.

The check boxes CB are such that the printing mode may be selected from the "normal printing", the "first overlapping printing" and the "second overlapping printing". In the present preferred embodiment, the mode selector 102 selects the printing mode, the check box CB of which has been checked from the three printing modes of the "normal printing", the "first overlapping printing" and the "second overlapping printing". In the example shown in FIG. 4, the selected printing mode is the "first overlapping printing". In the case in which the setting is made as shown in FIG. 4, the printer 10 forms the "first printing layer" as the lower layer and forms the "second printing layer" as the upper layer.

A numerical value may be input to the input box Bx in the interface shown in FIG. 4, to define the "first printing ratio". As described above, in the printer 10 in the present preferred embodiment, the sum of the ratios of the "first dot group" and the "second dot group" matches 100% of the entirety of the ink dots of the process color ink. That is, where the entirety of the ink dots of the process color ink is 100%, the "first dot group" and the "second dot group" are generated such that the sum thereof is 100%. Therefore, once the ratio of the "first dot group" with respect to the entirety of the ink dots of the process color ink is input (i.e., once the first printing ratio is input), the ratio of the "second dot group" with respect to the entirety of the ink dots of the process color ink (i.e., "second printing ratio") is automatically calculated. The expression that the generator 103 in the present preferred embodiment "generates" the "first dot group" and the "second dot group" indicates or substantially indicates that the entirety of the ink dots of the process color ink is "divided". In the example shown in FIG. 4, "25%" is input to the input box Bx of the ratio setter 105 as the first printing ratio. Therefore, the second printing ratio is about 75%, for example. In this manner, in the present preferred embodiment, the "first dot group" and the "second dot group" are generated such that the ink dots belonging to these groups do not overlap each other. Among all the ink dots of the process color ink, the ink dots remaining after the ink dots for the "first dot group" are extracted from the "second dot group".

The ratios of the "first dot group" and the "second dot group" may each be set to 0% or 100%, for example. In the case in which the ratio of the "first dot group" is set to 0% and the ratio of the "second dot group" is set to 100%, the conventional overlapping printing is performed. In the case in which the ratio of the "first dot group" is set to 100% and the ratio of the "second dot group" is set to 0%, the entire image is printed as the "first printing layer". According to the knowledge of the present inventor, it is preferred that the first printing ratio is about 0.5% to about 30%, for example.

In the present preferred embodiment, the first printing ratio is equal or substantially equal for all the colors of process color ink. More specifically, in the example shown in FIG. 4, about 25% of all the ink dots of each of cyan ink, magenta ink, yellow ink, black ink, gray ink, light cyan ink and light magenta ink is used to form the first printing layer, for example. Therefore, the image printed concurrently with the underlying color layer to form the "first printing layer" has the same color balance as that of the original image.

The ink dots belonging to the "first dot group" are, for example, randomly extracted from all the ink dots of each color of process color ink by the generator 103. In the case in which the first printing ratio is about 25% as shown in FIG. 4, the number of ink dots corresponding to about 25% of all the ink dots of each color of process color ink is extracted randomly, for example. Since the number of the ink dots included in the image is very large, a situation where the ink dots are extracted from a particular region does not occur easily even though the extraction is performed randomly. Therefore, an image that is the same as the original image, except that the printing density is low, is extracted. An image generated of the ink dots belonging to the "first dot group" is a "thin" image, the printing density of which is decreased from that of the original image.

Figure 5:
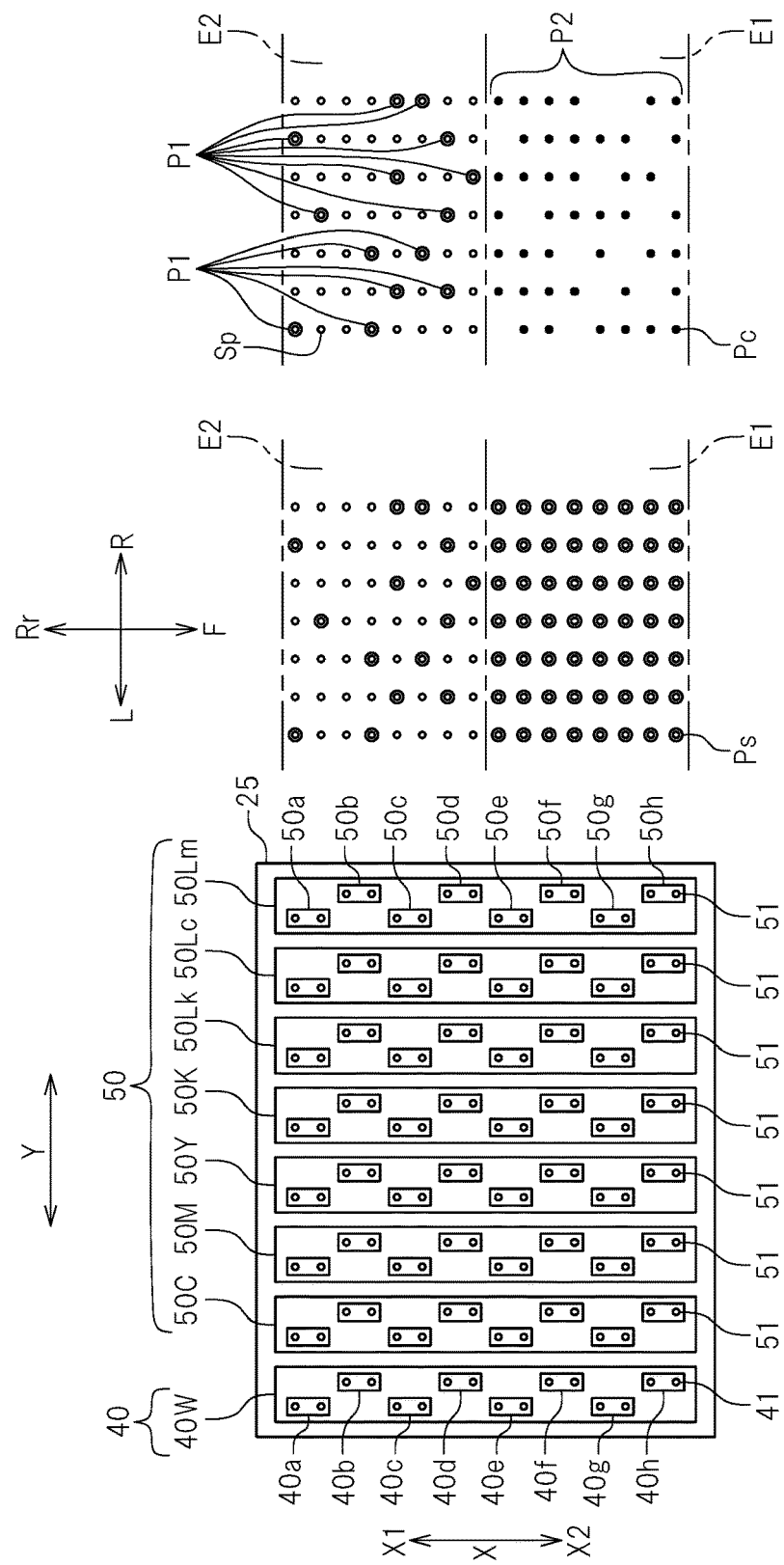
FIG. 5 is a schematic view showing positions at which ink lands in overlapping printing.
Figure 6:
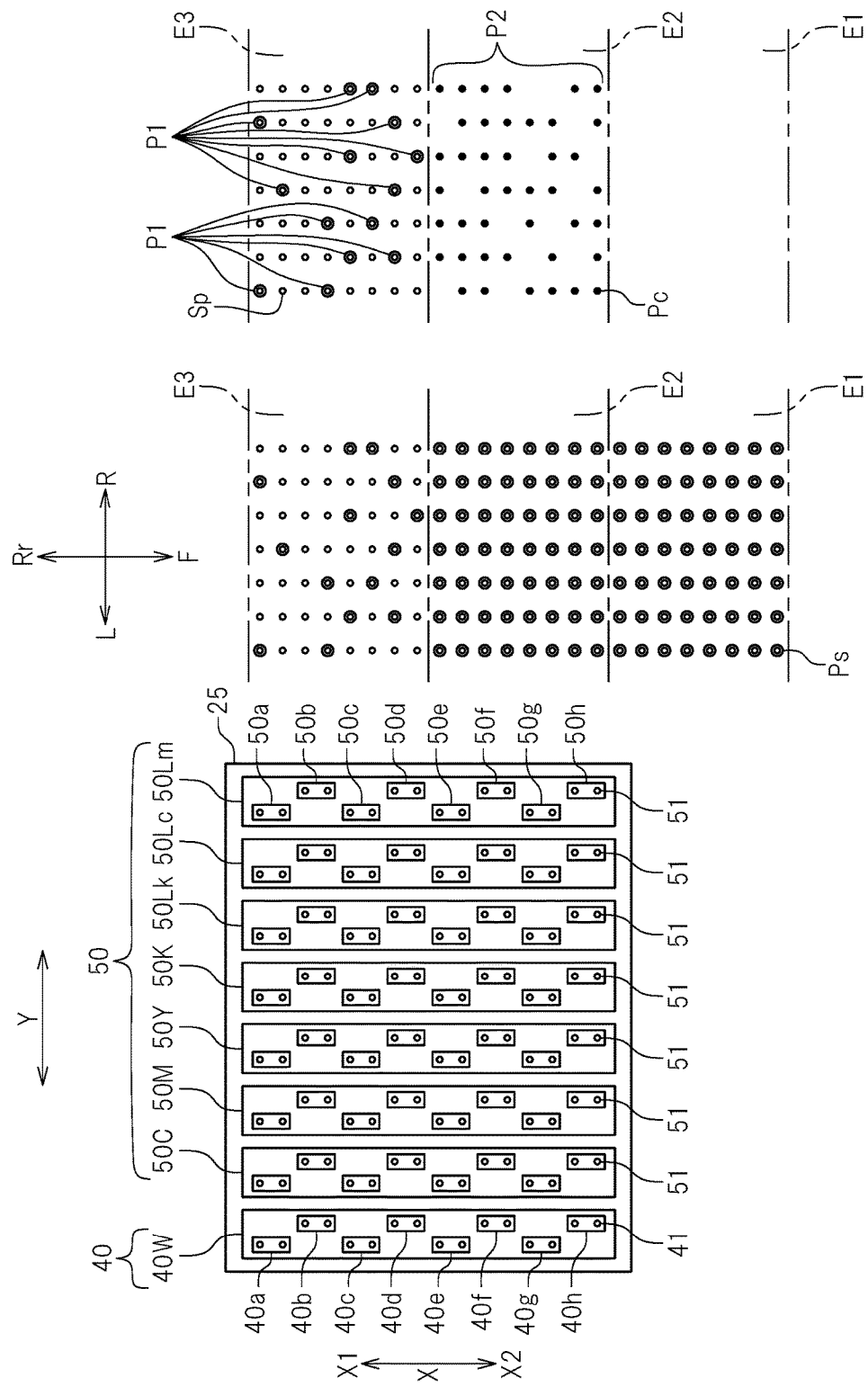
FIG. 6 is a schematic view showing a state at a time point after, by one pass, the time point shown in FIG. 5

After the printing mode and the printing ratio are set as described above, the overlapping printing is performed. Hereinafter, a printing process according to the printing conditions shown in FIG. 4 will be described. As described above, the printing mode selected in the example shown in FIG. 4 is the "first overlapping printing". The printing conditions shown in FIG. 4 are as follows. For forming the "first printing layer" as the lower layer, about 25% of the image and the underlying color ink are concurrently printed, for example. For forming the "second printing layer" as the upper layer, the remaining portion of the image, namely, about 75% of the image, is printed. FIG. 5 and FIG. 6 are schematic views showing positions at which the ink lands in the overlapping printing under the above-described conditions. FIG. 5 and FIG. 6 are views of the recording medium 5 as seen from the upper side U. In FIG. 5 and FIG. 6, the bottom side corresponds to the front side F of the printer 10, and the left side corresponds to the left side L of the printer 10. In FIG. 5 and FIG. 6, the recording medium 5 is fed from the upstream side X1 toward the downstream side X2 in the feeding direction X (from the rear side Rr toward the front side F). In FIG. 5 and FIG. 6, circles represent the positions at which the ink has landed. Among the circles, white circles Sp are positions at which the special color ink has landed. Hatched circles Pc are positions at which the process color ink has landed. Double circles Ps are positions at which both of the special color ink and the process color ink have landed. FIG. 6 shows a state of the same positions as those in FIG. 5, at a time point after, by one pass, the time point shown in FIG. 5. A left portion of each of FIG. 5 and FIG. 6 shows a state of the recording medium 5 at the corresponding time point (state in which all the ink dots formed until the corresponding time point overlap each other). A right portion of each of FIG. 5 and FIG. 6 shows only the ink dots formed only by the current pass. In FIG. 5 and FIG. 6, the ink dots belonging to the "first dot group" are represented by P1, and the ink dots belonging to the "second dot group" are represented by P2. FIG. 5 and FIG. 6 show the position of the carriage 25 in the feeding direction X at the respective time point.

As shown in FIG. 5, the white ink is ejected from the nozzles 41 of the sub ink heads 40a, 40b, 40c and 40d of the first ink head 40 toward a region E2 of the recording medium 5. Among the sub ink heads of the first ink head 40, the sub ink heads 40a, 40b, 40c and 40d are located in half of the region of the first ink head 40 on the upstream side X1 in the feeding direction X. Concurrently, about 25% of all the amount of the process color ink (first dot group P1) is ejected from the nozzles 51 of the sub ink heads 50a, 50b, 50c and 50d of the second ink head 50 toward the region E2, for example. In FIG. 5, such a state is shown in the form where two out of eight nozzles 51 eject the process color ink. Among the sub ink heads of the second ink head 50, the sub ink heads 50a, 50b, 50c and 50d are located in half of the region of the ink head 50 on the upstream side X1 in the feeding direction X. At the time point shown in FIG. 5, the "first printing layer" has been formed in the region E2.

A region E1 shown in FIG. 5 is downstream with respect to the region E2 of the recording medium 5. That is, the region E1 is advanced by one pass with respect to the region E2. As shown in the right part of FIG. 5, toward the region E1, about 75% of all the amount of the process color ink (second dot group P2) is ejected from the nozzles 51 of the sub ink heads 50e, 50f, 50g and 50h of the second ink head 50. In the right portion of FIG. 5, such a state is shown in the form where six out of the eight nozzles 51 eject the process color ink. Among the sub ink heads of the second ink head 50, the sub ink heads 50e, 50f, 50g and 50h are located in half of the region of the second ink head 50 on the downstream side X2 in the feeding direction X. In the region E1 shown in FIG. 5, the "second printing layer" has been formed over the "first printing layer". After the ejection is performed to form the "second printing layer", all the positions in the region E1 are put into the double circle Ps state. Thus, the printing on the region E1 is finished.

FIG. 6 shows the state at a time point after, by one pass, the time point shown in FIG. 5. The printing on the region E1 of the recording medium 5 has been finished, and the region E1 has been fed on the downstream side X2 in the feeding direction X with respect to the ink heads. At the time point shown in FIG. 6, the ejection is performed toward the region E2 in the same or substantially the same manner as the ejection performed toward the region E1 at the time point shown in FIG. 5. That is, about 75% of all the amount of the process color ink (second dot group P2) is ejected from the nozzles 51 of the second ink heads 50e, 50f, 50g and 50h of the second ink head 50 toward the region E2. At the time point shown in FIG. 6, the printing on the region E2 has been finished. At the time point shown in FIG. 6, the ejection is performed toward a region E3, which is on the upstream side X1 in the feeding direction X with respect to the region E2, in the same or substantially the same manner as the ejection performed toward the region E2 at the time point shown in FIG. 5. That is, toward the region E3, the white ink is ejected from the nozzles 41 of the sub ink heads 40a, 40b, 40c and 40d of the first ink head 40, and 25% of all the amount of the process color ink (first dot group P1) is ejected from the nozzles 51 of the sub ink heads 50a, 50b, 50c and 50d of the second ink head 50. In this manner, the printer 10 according to the present preferred embodiment continuously forms the "first printing layer" as the lower layer and the "second printing layer" as the upper layer.

In the "second overlapping printing", the upper layer and the lower layer are opposite to those of the "first overlapping printing". In the "second overlapping printing", first, about 75% of all the amount of the process color ink (second dot group P2) is ejected from the nozzles 51 of the sub ink heads 50a, 50b, 50c and 50d of the second ink head 50 to form the "second printing layer", for example. Then, the "first printing layer" is formed on the "second printing layer". More specifically, the white ink is ejected from the nozzles 41 of the sub ink heads 40e, 40f, 40g and 40h of the first ink head 40, and about 25% of all the amount of the process color ink (first dot group P1) is ejected from the nozzles 51 of the sub ink heads 50e, 50f, 50g and 50h of the second ink head 50, for example. Thus, the "first printing layer" is formed. The process of the continuous printing is the same as in the "first overlapping printing".

As described above, the printer 10 in the present preferred embodiment generates the "first dot group" and the "second dot group" of the entirety of the ink dots of the process color ink, and forms the "first printing layer" of the ink dots of the "first dot group" and the ink dots of the special color ink. The printer 10 in the present preferred embodiment further forms the "second printing layer" of the ink dots of the "second dot group", above or below the "first printing layer". With the printer 10 in the present preferred embodiment, the "first printing layer" in which a portion of the image is mixed in the underlying color layer is formed, and the "second printing layer" formed of another portion of the image is provided so as to overlap the "first printing layer". In this manner, the printed image appears to be three-dimensional and massive.

In the present preferred embodiment, the generator 103 generates the "first dot group" and the "second dot group" such that the sum of thereof matches the entirety of the ink dots of the process color ink. Therefore, all the ink dots are printed on the recording medium 5 in a finished state.

The controller 100 in the present preferred embodiment includes the ratio setter 105 to set the ratios of the "first dot group" and the "second dot group" with respect to the entirety of the ink dots of the process color ink. The generator 103 generates the "first dot group" and the "second dot group" such that the ratios thereof with respect to the entirety of the ink dots of the process color ink are the same as the ratios set by the ratio setter 105. The ratio setter 105 sets the ratios, so that the quality of the resultant printed image is adjustable, and a precise need regarding the image quality adjustment is fulfilled.

The generator 103 in the present preferred embodiment extracts ink dots belonging to the "first dot group" randomly from all the ink dots of the process color ink. Since the ink dots for the "first dot group" are extracted from a large number of ink dots, it does not occur that many ink dots are extracted from a particular region. Therefore, an image provided by the "first dot group" is the same or substantially the same as the original image, except that the printing density is low. Thus, the printer 10 in the present preferred embodiment is able to form an image having the same or substantially the same color balance as that of the original image even by the overlapping printing.

The printer 10 in the present preferred embodiment includes the mode selector 102. The mode selector 102 allows either one of the "first overlapping printing" and the "second overlapping printing" to be selected as a mode of overlapping printing. The "first overlapping printing" is a printing mode of forming the "first printing layer" as the lower layer and forming the "second printing layer" as the upper layer. The "second overlapping printing" is a printing mode of forming the "second printing layer" as the lower layer and forming the "first printing layer" as the upper layer. Since the mode selector 102 is included, the printer 10 in the present preferred embodiment is usable for either the "first overlapping printing" or the "second printing layer". This is especially effective in the case in which the recording medium is transparent because such a transparent recording medium may be used in a case in which a printing surface of the printed item is to be viewed or in a case in which a surface opposite to the printing surface of the printed item is to be viewed.

The mode selector 102 and the ratio setter 105 have the interfaces as described above. Alternatively, neither the mode selector 102 nor the ratio setter 105 needs to include the interfaces to which the operator inputs information for settings. For example, the printing data may include the printing mode and the first and second printing ratios, so that the printing mode and the printing ratios are automatically set. The interfaces do not need to be in the layout shown in FIG. 4. For example, the interfaces may not include the input boxes Bx to each of which a numerical value is may be input, but may be a tool by which a color developing level such as "clear", "normal" "blurred" or the like may be selected. In this case, the printing ratios corresponding to such various levels are preset.

In the above-described preferred embodiment, the ink dots belonging to the "first dot group" preferably are extracted randomly. The extraction method is not limited to this. For example, the ink dots for the "first dot group" may be extracted by some statistical technique instead of randomly.

Preferred Embodiment 2

In preferred embodiment 2 of the present invention, the sum of the ink dots belonging to the "first dot group" and the ink dots belonging to the "second dot group" may exceed 100% with respect to the entirety of the ink dots of the process color ink. That is, the sum of the first printing ratio and the second printing ratio may exceed 100%. Except for this point, the printer 10 in preferred embodiment 2 is the same as the printer 10 in preferred embodiment 1. In the following description of preferred embodiment 2, the components same as those of preferred embodiment 1 will bear the same reference signs, and overlapping descriptions will be omitted or simplified.

Figure 7:
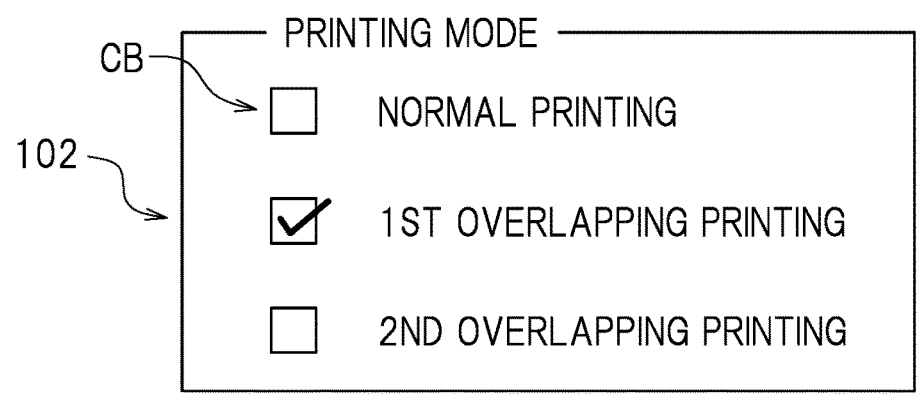
FIG. 7 shows interfaces according to preferred embodiment 2 of the present invention.
Figure 7:
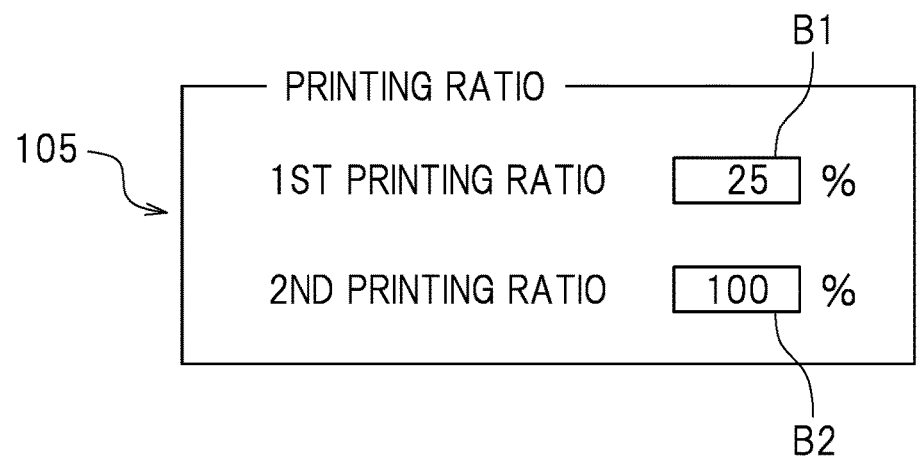

FIG. 7 shows an example of interfaces in the present preferred embodiment. The mode selector 102 and the ratio setter 105 have interfaces shown in FIG. 7, like in the case of FIG. 4. The ratio setter 105 shown in FIG. 7 includes two boxes, namely, a first box B1 and a second box B2. The ratio of the "first dot group" with respect to the entirety of the ink dots of the process color ink (namely, the first printing ratio) may be input to the first box B1. The ratio of the "second dot group" with respect to the entirety of the ink dots of the process color ink (namely, the second printing ratio) may be input to the second box B2. A numerical value may be input to each of the first input box B1 and the second input box B2.

In FIG. 7, "25%" is input to the first input box B1. "100%" is input to the second input box B2. In the example shown in FIG. 7, the printing ratios of the "first dot group" and the "second dot group" are input such that the sum thereof is about 125%, for example. In the example shown in FIG. 7, the "first overlapping printing" is selected by the mode selector 102. Namely, according to the printing settings shown in FIG. 7, the special color ink and about 25% of all the amount of the process color ink are ejected to form the "first printing layer" as the lower layer. 100% of all the amount of the process color ink is ejected to form the "second printing layer" as the upper layer.

As described above, the generator 103 in the present preferred embodiment may generate the "first dot group" and the "second dot group" such that a portion of, or the entirety of, the ink dots of the process color ink overlap in the "first dot group" and the "second dot group". The ratio setter 105 is configured and/or programmed to deal with such a situation. With such a structure, the printer 10 in the present preferred embodiment improves the degree of freedom in adjusting the quality of the printed image. An image printed with the ink dots exceeding 100% of the ink dots of the original image is expected to be clearer than an image printed with the ink dots of 100%. Especially in the case in which it is difficult to provide a desired printing quality with mere adjustment on the printing ratio of the "first dot group", the printer 10 in the present preferred embodiment is effective. In the case in which the final ink amount exceeds 100% of the ink dots of the process color ink, the range of colors that may be represented by the same printer by use of the same types of ink (so-called color gamut) is expanded.

In FIG. 7, "100%" is input to the second input box B2. Alternatively, another numerical value such as, for example, "90%" may be input to the second input box B2. In the case in which the first printing ratio is about 25% and the second printing ratio is about 90%, the sum thereof is about 115%, for example. It is preferred that the ratio setter 105 is configured and/or programmed such that unless the sum of the first printing ratio and the second printing ratio is 100% or higher, an error alert is issued. In the case in which, for example, the first printing ratio of about 25% and the second printing ratio of about 70% are input, the sum of the printing ratios is about 95%, for example. Since the sum of the printing ratios is lower than 100%, it is desirable that an error alert is issued. In the present preferred embodiment, the maximum possible total printing ratio of the first printing ratio and the second printing ratio is 200%, in which case, the first printing ratio is 100% and the second printing ratio is 100%.

In a modification of preferred embodiment 2, the second printing ratio may be fixed to "100%". That is, the printer 10 may be configured and/or programmed such that the "second dot group" always matches the entirety of the ink dots of the process color ink. In this modification, the "second printing layer" is formed by the conventional overlapping, whereas a portion of the image is included in the "first printing layer". In this modification, an image appearing to have thickness and massiveness is able to be provided with a relatively simple adjustment. In fact, the present inventor has confirmed that the above-described overlapping printing provides an image appearing to be deeper and more massive than an image provided by the conventional overlapping printing. Such an image appearing to be deeper and more massive is formed under the condition that, for example, the first printing ratio is about 20% to about 30% (the second printing ratio is fixed to 100%), for example.

Preferred Embodiment 3

In preferred embodiment 3 of the present invention, the ink dots of "first dot group" and the ink dots of the "second dot group" have an adjustable dot size. Therefore, the dot size of the "first dot group" and the dot size of the "second dot group" may be different from each other. The controller 100 of the present preferred embodiment includes a first size controller 106a and a second size controller 106b (see FIGS. 8A and 8B for both) and also includes a first size setter 107a and a second size setter 107b (see FIG. 9 for both). Except for this point, preferred embodiment 3 is the same as preferred embodiment 2.

Figure 8A:
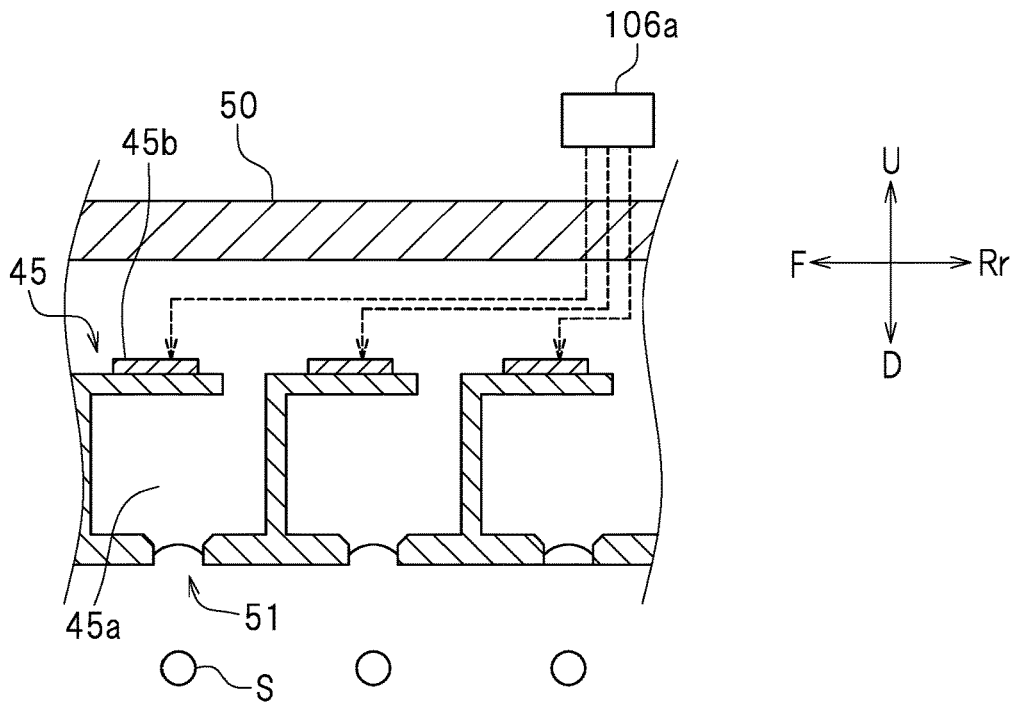
FIG. 8A is a vertical cross-sectional view of nozzles from which process color ink to form a "first dot group" is ejected.
Figure 8B:
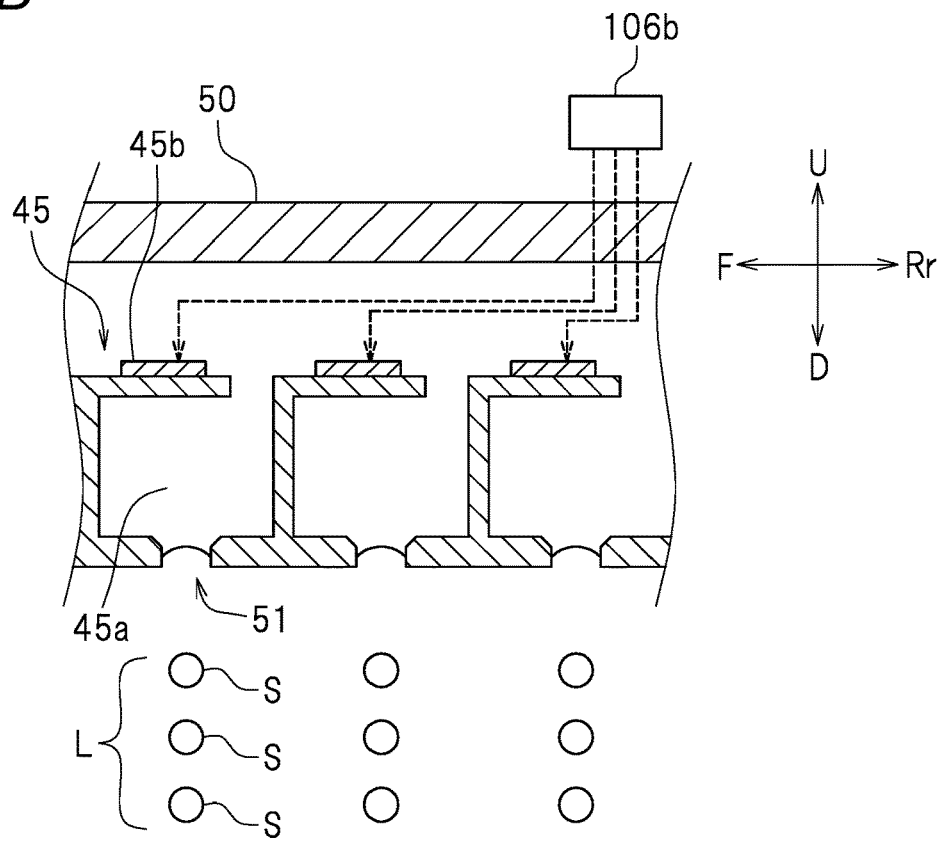
FIG. 8B is a vertical cross-sectional view of nozzles from which process color ink to form a "second dot group" is ejected.

FIGS. 8A and 8B are schematic views of the nozzles 51 of one second ink head 50 and the vicinity thereof. FIG. 8A is a vertical cross-sectional view of the nozzles 51, through which the process color ink to form the "first dot group" is ejected. FIG. 8B is a vertical cross-sectional view of the nozzles 51, through which the process color ink to form the "second dot group" is ejected. As shown in FIGS. 8A and 8B, the first size controller 106a and the second size controller 106b are each connected with the piezoelectric elements 45b of the actuators 45 provided in each ink head. The control on the dot size by the first size controller 106a and the second size controller 106b may be performed on a nozzle-by-nozzle basis, namely, on a piezoelectric element 45b-by-piezoelectric element 45b basis. The first size controller 106a and the second size controller 106b each control the driving of the corresponding piezoelectric elements 45b to control the dot size of the ink to be ejected from the nozzles of the corresponding ink head. The first size controller 106a controls the dot size of the "first dot group". The second size controller 106b controls the dot size of the "second dot group". In accordance with whether the printing mode is the "first overlapping printing" or the "second overlapping printing", different piezoelectric elements 45b are controlled by the first size controller 106a and the second size controller 106b. In each of the "first overlapping printing" and the "second overlapping printing", the nozzles 51 ejecting the process color ink to form the "first dot group" and the nozzles 51 ejecting the process color ink to form the "second dot group" are the same as described in preferred embodiment 1.

The first size setter 107a is usable to set the dot size of the process color ink to form the "first dot group". The first size controller 106a adjusts the dot size of the process color ink to form the "first dot group" to the dot size set by the first size setter 107a. Similarly, the second size setter 107b is usable to set the dot size of the process color ink to form the "second dot group". The second size controller 106b adjusts the dot size of the process color ink to form the "second dot group" to the dot size set by the second size setter 107b.

Figure 9:
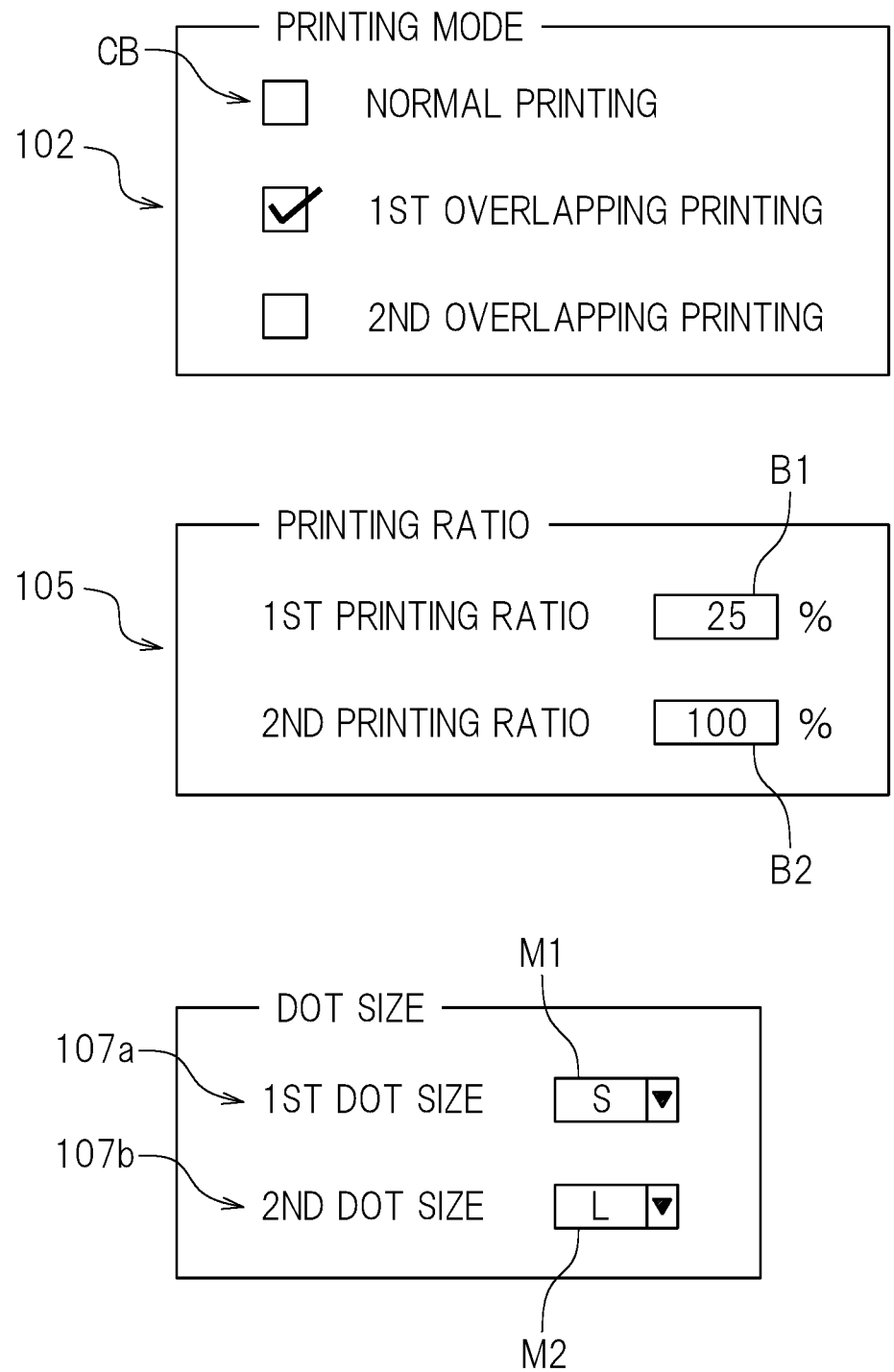
FIG. 9 shows interfaces according to preferred embodiment 3 of the present invention.

FIG. 9 shows interfaces according to the present preferred embodiment. As shown in FIG. 9, the first size setter 107a and the second size setter 107a each display a first menu M1 and a second menu M2 on an interface screen. The first menu M1 is usable to select the dot size of the ink to form the "first dot group" (i.e., first dot size). The second menu M2 is usable to select the dot size of the ink to form the "second dot group" (i.e., second dot size). In the present preferred embodiment, the dot size may be selected from three sizes of S, M and L. In the example shown in FIG. 9, the S size is selected as the dot size of the ink to form the "first dot group", and the L size is selected as the dot size of the ink to form the "second dot group".

In many cases, image data includes size data on the three ink dot sizes of S, M and L beforehand. In the size data, the S-sized ink dots, the M-sized ink dots and the L-size ink dots are included in a mixed state. Thus, the first size setter 107a and the second size setter 107b change the size data included in the image data to change the dot size of the ink to form the "first dot group" and the "second dot group".

The first size controller 106a, the second controller 106b and the actuators 45 in the present preferred embodiment may adjust the dot size of the ink to be ejected to any of the three dot sizes of S, M and L. Among the three sizes, the S size is a basic size. An ink dot having the S size has the smallest volume. An ink dot having the M size has the next smallest volume. The volume of the ink dot having the M size is, for example, twice the volume of the ink dot having the S size. An ink dot having the L size has the largest volume. The volume of the ink dot having the L size is, for example, three times the volume of the ink dot having the S size. In the present preferred embodiment, there are three dot sizes. There may be four or more dot sizes, or there may be two dot sizes. It is not necessary that the volume of one size is twice or three times the volume of another size.

FIG. 8A shows a state in which S-sized ink drops S are ejected from the nozzles 51. The ink drops S are each formed of ink that is ejected as a result of contraction of the pressure chamber 45a, which is caused by the piezoelectric element 45b being displaced once. That is, the volume of each of the ink drops S matches a decrease in the volume of the pressure chamber 45a that is caused by the pressure chamber 45a being contracted once.

FIG. 8B shows a state in which L-sized ink drops L are ejected from the nozzles 51 of the second ink head 50. The dot size of the "second dot group" is the L size. In FIG. 8B, the actuators 45 each eject three S-sized ink drops S from the corresponding nozzle. This is realized by the ejection being performed three times with a very short interval. Therefore, the three ink drops S land at the same or substantially the same position although the carriage 25 moves. As a result of the three ink drops S landing at the same or substantially the same position, an L-sized ink drop L having a volume three times the volume of an S-sized ink drop S is formed. In this manner, the first size controller 106a and the second size controller 106b control the actuators 45 to adjust the dot sizes of the "first dot group" and the "second dot group" to sizes set by the first size setter 107a and the second size setter 107b.

As described above, the printer 10 in the present preferred embodiment includes the first size controller 106a controlling the dot size of the "first dot group", the second size controller 106b controlling the dot size of the "second dot group", the first size setter 107a usable to set the dot size of the "first dot group", and the second size setter 107b usable to set the dot size of the "second dot group". Thus, the printer 10 in the present preferred embodiment further improves the degree of freedom in adjusting the image quality. In the case in which, for example, the dot size of the "first dot group" is adjusted to be smaller than the dot size of the "second dot group", the image mixed in the underlying color layer is inconspicuous and the printed image appears to be natural. By contrast, in the case in which the dot size of the "first dot group" is adjusted to be larger than the dot size of the "second dot group", the image mixed in the underlying color layer appears conspicuous and presents a stronger visual effect.

The interfaces of the first size setter 107a and the second size setter 107b do not need to be in the form shown in FIG. 9. For example, the first size setter 107a and the second size setter 107b may allow the color developing level to be selected from, for example, "clear", "normal", "blurred" and the like. In this case, the dot size corresponding to each color developing level is automatically selected. The above-described method for controlling the dot size is merely an example. The method for controlling the dot size is not limited to the above-described method.

Some preferred embodiments of the present invention have been described. The above-described preferred embodiments are merely examples, and the technology disclosed herein may be implemented and performed in any of various applications.

For example, in the above-described preferred embodiments, the controller 100 preferably includes the ratio setter 105. The controller 100 does not need to include the ratio setter 105. In the case in which the controller 100 does not include the ratio setter 105, the first printing ratio and the second printing ratio may be, for example, fixed, automatically calculated, or included in the image data. This is applicable to the first size setter 107a and the second size setter 107b. The controller 100 does not need to include the first size setter 107a or the second size setter 107b. In the case in which the controller 100 does not include the first size setter 107a or the second size setter 107b, the first size controller 106a and the second size controller 106b, for example, causes the ink for each of the "first dot group" and the "second dot group" to be ejected with a predefined dot size. The dot size of the "first dot group" may be set to be smaller than the dot size of the "second dot group". In the case in which the dot size of the "first dot group" is smaller than the dot size of the "second dot group", the image mixed in the underlying color layer can be inconspicuous and the printed image can appear to be natural. By contrast, the dot size of the "first dot group" may be set to be larger than the dot size of the "second dot group". In the case in which the dot size of the "first dot group" is larger than the dot size of the "second dot group", the image mixed in the underlying color layer appears conspicuous and presents a stronger visual effect.

According to the "overlapping printing" in the above-described preferred embodiments, two layers, that is, a lower layer and an upper layer, are printed in an overlapping state. Alternatively, three or more layers may be formed in an overlapping state. For example, three layers of an underlying color layer, an image layer, and a top coat, may be printed in an overlapping state. In this case, the top coat may be, for example, transparent ink. In the case in which three or more layers are printed in an overlapping state, three or more dot groups may be generated of the entirety of the ink dots of the process color ink, instead of only the "first dot group" and the "second dot group".

Figure 10:
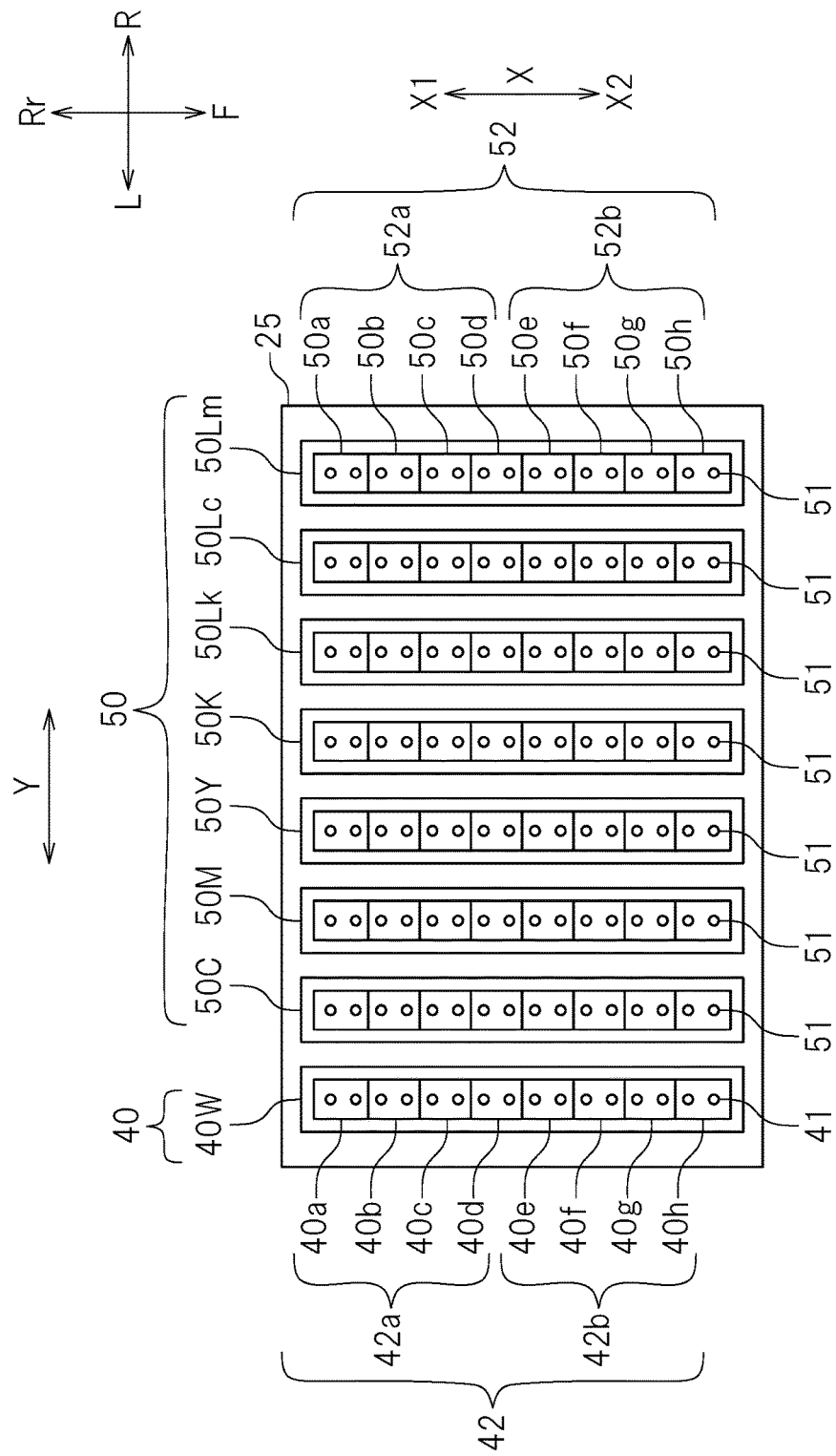
FIG. 10 is a schematic view showing a structure of a bottom surface of a carriage different from the carriage in preferred embodiments 1 through 3 of the present invention.

In the above-described preferred embodiments, preferably the first ink head 40 and the second ink heads 50 each include a plurality of sub ink heads, and the sub ink heads are located in a staggered arrangement in two lines in the corresponding ink head. The positional arrangement of the sub ink heads in each ink head is not limited to the above-described arrangement. FIG. 10 shows a structure of a bottom surface of a carriage 25 having a positional arrangement of the sub ink heads that is different from that of the carriage 25 in preferred embodiments 1 through 3. The technology disclosed herein is applicable to, for example, a printer 10 including the sub ink heads arrayed as shown in, for example, FIG. 10. In FIG. 10, the sub ink heads are arrayed in one line in the feeding direction X in each ink head.

In the preferred embodiment shown in FIG. 10, the first ink head 40 includes the plurality of sub ink heads 40a through 40h arrayed in one line in the feeding direction X. The sub ink heads 40a through 40h each include the plurality of nozzles 41 arrayed in one line in the feeding direction X. Therefore, the nozzles 41 define a nozzle array 42 extending in one line in the feeding direction X. The nozzle array 42 is divided into a first upstream nozzle array 42a located on the upstream side X1 in the feeding direction X and a first downstream nozzle array 42b located on the downstream side X2 in the feeding direction X. The first upstream nozzle array 42a includes the nozzles 41 in the four sub ink heads 40a, 40b, 40c and 40d located on the upstream side X1 in the feeding direction X. The first downstream nozzle array 42b includes the nozzles 41 in the four sub ink heads 40e, 40f, 40g and 40h located on the downstream side X2 in the feeding direction X. The number of the nozzles 41 in the first upstream nozzle array 42a and the number of the nozzles 41 in the first downstream nozzle array 42b are preferably equal to each other. The first upstream nozzle array 42a and the first downstream nozzle array 42b are distinguished as described above for the purpose of control, and do not have any structural difference.

In the preferred embodiment shown in FIG. 10, the plurality of second ink heads 50C, 50M, 50Y, 50K, 50Lk, 50Lc and 50Lm each preferably include the plurality of sub ink heads 50a through 50h arrayed in one line in the feeding direction X. The sub ink heads 50a through 50h each include the plurality of nozzles 51 arrayed in one line in the feeding direction X. Therefore, in each of the ink heads 50C, 50M, 50Y, 50K, 50Lk, 50Lc and 50Lm, the nozzles 51 define a nozzle array 52 extending in one line in the feeding direction X. The nozzle array 52 is divided into a second upstream nozzle array 52a located on the upstream side X1 in the feeding direction X and a second downstream nozzle array 52b located on the downstream side X2 in the feeding direction X. The second upstream nozzle array 52a includes the nozzles 51 in the four sub ink heads 50a, 50b, 50c and 50d located on the upstream side X1 in the feeding direction X. The second downstream nozzle array 52b includes the nozzles 51 in the four sub ink heads 50e, 50f, 50g and 50h located on the downstream side X2 in the feeding direction X. The number of the nozzles 51 in the second upstream nozzle array 52a and the number of the nozzles 51 in the second downstream nozzle array 52b are preferably equal or substantially equal to each other. The second upstream nozzle array 52a and the second downstream nozzle array 52b are distinguished as described above also for the purpose of control, and do not have any structural differences. The nozzles 51 in each of the ink heads 50C, 50M, 50Y, 50K, 50Lk, 50Lc and 50Lm are arrayed at positions matched, in the feeding direction X, to the positions of the nozzles 41 in the ink head 40W included in the first ink head 40.

Figure 11:
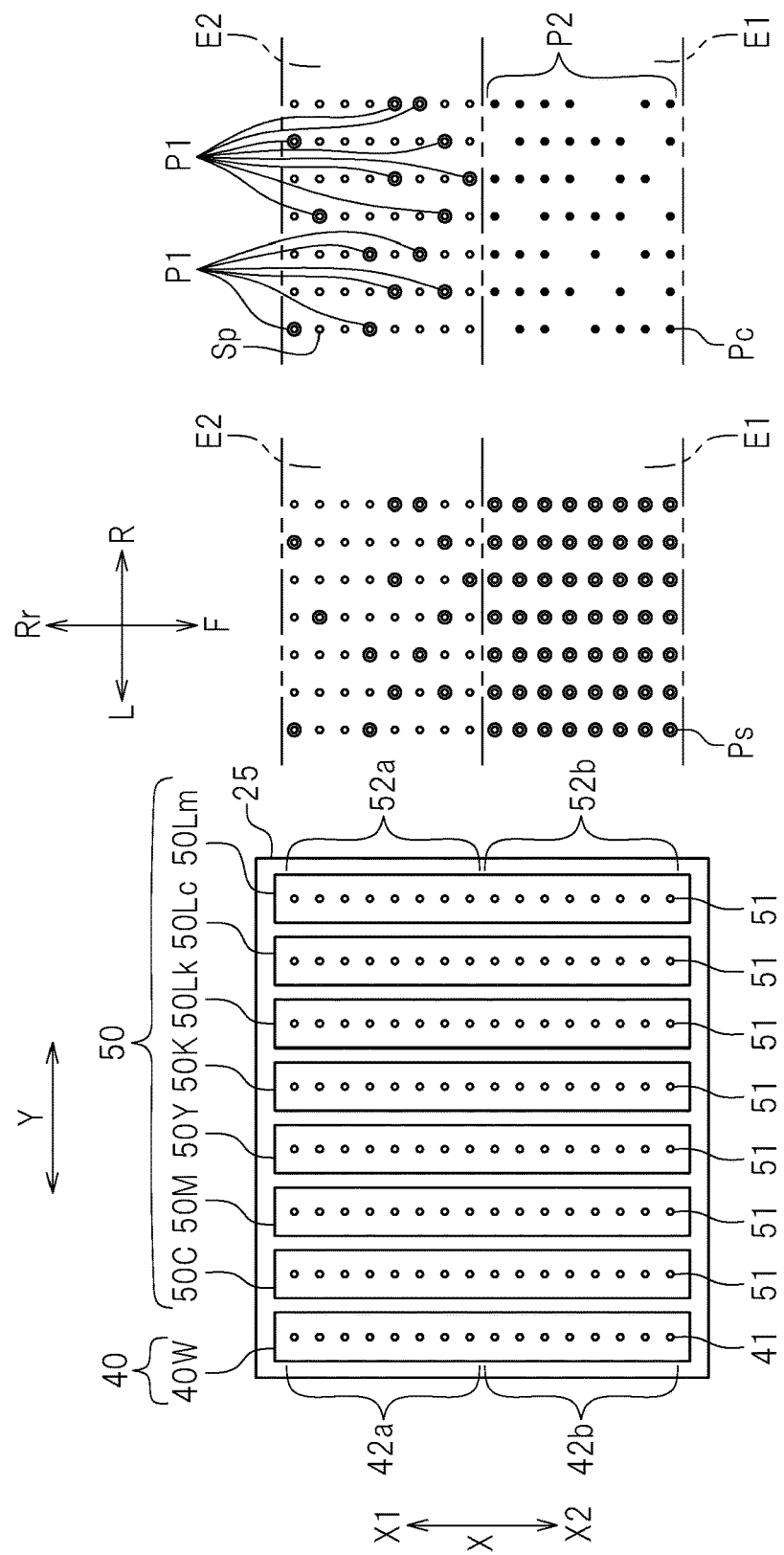
FIG. 11 is a schematic view showing positions at which the ink lands in overlapping printing performed by a printer shown in FIG. 10.

The printer 10 in which the carriage 25 has the structure of the bottom surface shown in FIG. 10 may continuously perform the "first overlapping printing" and the "second overlapping printing". FIG. 11 is a schematic view showing positions at which the ink lands in the overlapping printing performed by the printer 10 shown in FIG. 10. The printing conditions in FIG. 11 are the same as those in FIG. 5 and FIG. 6. FIG. 11 shows the "first overlapping printing" performed under the conditions that the "first printing layer" is formed, as the lower layer, of about 25% of the ink dots of the process color ink and the ink dots of the special color ink and the "second printing layer" is formed, as the upper layer, of the remaining ink dots, that is, about 75% of the ink dots of the process color ink. FIG. 11 shows a state at the same time point as that of FIG. 5. A left portion of FIG. 11 shows a state in which all the ink dots that have landed until the corresponding time point overlap each other. A right portion of FIG. 11 shows only the ink dots that have landed only by the current pass. The reference signs and the symbols used for the ink dots in FIG. 11 are the same as those in FIG. 5.

As shown in FIG. 11, the white ink is ejected from the nozzles 41 of the first upstream nozzle array 42a toward the region E2 of the recording medium 5. Concurrently, about 25% of all the amount of the process color ink (first dot group P1) is ejected from the nozzles 51 of the second upstream nozzle array 52a toward the region E2, for example. At the time point shown in FIG. 11, the "first printing layer" has been formed in the region E2.

The region E1 shown in FIG. 11 is downstream with respect to the region E2 of the recording medium 5. That is, the region E1 is advanced by one pass with respect to the region E2. As shown in the right part of FIG. 11, about 75% of all the amount of the process color ink (second dot group P2) is ejected from the second downstream nozzle array 52b toward the region E1. In the region E1, the "second printing layer" has been formed over the "first printing layer". With this ejection to form the "second printing layer", the printing on the region E1 is finished. As described above with reference to FIG. 5 and FIG. 6, the above-described process is continued while the recording medium 5 is sequentially fed forward (F). Therefore, at the pass next to the time point shown in FIG. 11, the printing on the region E2 is finished. In this manner, the "first overlapping printing" is continuously performed even by the printer 10 including the nozzles located as shown in FIG. 10.

The process of the "second overlapping printing" is substantially the same as that of the "first overlapping printing" except for the nozzles from which the ink is ejected. In the case in which the "second overlapping printing" is selected, the "second printing layer" is formed as the lower layer whereas the "first printing layer" is formed as the upper layer. The process color ink to form the second dot group P2 is ejected from the nozzles 51 of the second upstream nozzle 52a. The "second printing layer" is formed of the ink dots of the second dot group P2. The process color ink to form the first dot group P1 is ejected from nozzles 51 of the second downstream nozzle array 52b, and the special color ink is ejected from the nozzles 41 of the first downstream nozzle array 42b. The "first printing layer" is formed of the ink dots of the special color ink and the ink dots of the first dot group P1. In this manner, the printer 10 including the nozzles located as shown in FIG. 10 may continuously perform the "second overlapping printing" like the "first overlapping printing".

In the case in which an odd number of sub ink heads are provided in an ink head and, thus, the sub ink heads are not equally divided into two, one of the sub ink heads may not be used, for example. The sub ink head not to be used may be the sub ink head located at the end on the upstream side X1, or on the downstream side X2, in the feeding direction X among the sub ink heads included in the ink head. Alternatively, the nozzles in the sub ink head through which the border line, equally dividing the nozzle array into two in the feeding direction X, passes may be divided by the border line into two, that is, into the nozzles (s) on the upstream side X1 and the nozzle(s) on the downstream side X2.

The ink heads in the carriage 25 may be disposed in a different positional arrangement. For example, the first ink head 40 and the plurality of second ink heads 50 may be offset in the feeding direction X. In the case in which the first ink head 40 and the second ink heads 50 are completely offset in the feeding direction X, the plurality of nozzles in each ink head are not used as being divided into the upstream nozzles and the downstream nozzles. In this case, all the nozzles in the ink head are preferably used. In the case in which the first ink head 40 and the second ink heads 50 are partially offset in the feeding direction X, the number of the usable nozzles is smaller than in the case in which the ink heads are completely offset, but the carriage 25 may be made compact. Alternatively, the first ink head 40 and the second ink heads 50 may be mounted on, and may be movable by, different carriages. Still alternatively, the printing of the "first printing layer" and the printing of the "second printing layer" may be performed as completely different steps.

In the above-described preferred embodiments, the ink is preferably ejected by a piezo-driving system of changing the volume of the pressure chamber 45a by the displacement of the piezoelectric element 45b. Alternatively, a printer according to a preferred embodiment of the present invention may use, for example, any of continuous systems such as a binary deflection system, a continuous deflection system and other suitable systems, or any of on-demand systems including a thermal system and other suitable systems. There is no limitation on the ink ejection system according to preferred embodiments of the present invention.

In the above-described preferred embodiments, the carriage 25 moves in the scanning direction Y whereas the recording medium 5 moves in the feeding direction X. A printer according to a preferred embodiment of the present invention is not limited to such a system. The movement of the carriage 25 and the recording medium 5 are relative, and either one of the carriage 25 and the recording medium 5 may be moved in the scanning direction Y or the feeding direction X. For example, the recording medium 5 may be unmovable whereas the carriage 25 may be movable in both of the scanning direction X and the feeding direction X. Alternatively, both of the carriage 25 and the recording medium 5 may be movable in both of the directions.

The technology disclosed herein is applicable to any of various types of inkjet printers. The technology disclosed herein is applicable to a roll-to-roll printer in which a roll recording medium 5 is fed as described in the above-described preferred embodiments, or to a flat-bed inkjet printer, for example. The printer 10 is not limited to a printer independently usable, and may be a printer that is combined with another device. For example, the printer 10 may be incorporated into another device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which may be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. An inkjet printer, comprising:
   a first ink head including a plurality of nozzles through which a first ink is ejected towards a recording medium to form ink dots of the first ink on the recording medium;
   a second ink head including a plurality of nozzles through which a second ink is ejected towards the recording medium to form ink dots of the second ink on the recording medium;
   a moving mechanism to move the first ink head and the second ink head, and the recording medium, with respect to each other; and
   a controller connected with the first ink head, the second ink head and the moving mechanism, to control the first ink head, the second ink head and the moving mechanism;
   wherein
   the controller includes:
      a converter to convert image data of the first ink into the ink dots of the first ink, and to convert image data of the second ink into the ink dots of the second ink;

a generator to generate, upon receipt of data on the ink dots of the second ink converted by the converter, a plurality of dot groups, including at least a first dot group and a second dot group, of the ink dots of the second ink, the first dot group including at least a portion of the ink dots of the second ink, and the second dot group including at least a portion of the ink dots of the second ink;

a first printing controller to form, on the recording medium, a first printing layer of the ink dots of the first ink and the ink dots of the first dot group; and a second printing controller to form a second printing layer of the ink dots of the second dot group, above or below the first printing layer; and the generator generates the plurality of dot groups such that the plurality of dot groups include all the ink dots of the second ink;

the first ink is a special color ink; and the second ink is a process color ink.

2. The inkjet printer according to claim 1, wherein the generator generates the plurality of dot groups such that the plurality of dot groups match the ink dots of the second ink.

3. The inkjet printer according to claim 1, wherein the generator generates the plurality of dot groups such that a portion of, or an entirety of, the ink dots of the second ink overlap in the plurality of dot groups.

4. The inkjet printer according to claim 3, wherein the generator generates the plurality of dot groups such that the second dot group matches the ink dots of the second ink.

5. The inkjet printer according to claim 1, wherein the controller includes a ratio setter to set a ratio of ink dots belonging to each of the plurality of dot groups with respect to the ink dots of the second ink; and the generator generates the plurality of dot groups such that the ratio of the ink dots belonging to each of the plurality of dot groups with respect to the ink dots of the second ink is the same as the ratio set by the ratio setter.

6. The inkjet printer according to claim 1, wherein the controller includes a mode selector to select any one of a plurality of printing modes including a first printing mode of forming the first printing layer below the second printing layer and a second printing mode of forming the first printing layer above the second printing layer.

7. The inkjet printer according to claim 1, wherein the second ink head includes actuators causing the second ink to be ejected from the nozzles; and the controller includes:

a first color size controller to control the actuators such that a dot size of the second ink forming the first dot group is a first size; and a second size controller to control the actuators such that a dot size of the second ink forming the second dot group is a second size.

8. The inkjet printer according to claim 7, wherein the controller includes:

a first size setter connected with the first size controller to allow the first size to be set; and a second size setter connected with the second size controller to allow the second size to be set.

9. The inkjet printer according to claim 7, wherein the first size is smaller than the second size.

10. The inkjet printer according to claim 1, wherein the generator randomly extracts the ink dots belonging to the first dot group from the ink dots of the second ink.

11. The inkjet printer according to claim 6, further comprising a user interface that is connected to the mode selector and that enables a user to select the one of a plurality of printing modes.

12. The inkjet printer according to claim 6, wherein the plurality of printing modes includes a third printing mode of printing only one layer.

13. An inkjet printer comprising:

a first ink head including a plurality of nozzles through which a first ink is ejected towards a recording medium to form ink dots of the first ink on the recording medium;

a second ink head including a plurality of nozzles through which a second ink is ejected towards the recording medium to form ink dots of the second ink on the recording medium;

a moving mechanism to move the first ink head and the second ink head, and the recording medium, with respect to each other; and a controller connected with the first ink head, the second ink head and the moving mechanism, to control the first ink head, the second ink head and the moving mechanism;

wherein the controller includes:

a generator to generate, upon receipt of data on the ink dots of the second ink, a plurality of dot groups, including at least a first dot group and a second dot group, of the ink dots of the second ink;

a first printing controller to form, on the recording medium, a first printing layer of the ink dots of the first ink and the ink dots of the first dot group; and a second printing controller to form a second printing layer of the ink dots of the second dot group, above or below the first printing layer; and the generator generates the plurality of dot groups such that the plurality of dot groups include all the ink dots of the second ink;

the moving mechanism includes a feeding mechanism to feed the recording medium;

the first ink head and the second ink head are located side by side in a scanning direction perpendicular or substantially perpendicular to a feeding direction in which the recording medium is fed;

the first ink head includes:

a first upstream nozzle array including a portion of the plurality of nozzles arrayed in the feeding direction; and a first downstream nozzle array including another portion of the plurality of nozzles arrayed in the feeding direction, the first downstream nozzle array being located downstream with respect to the first upstream nozzle array in the feeding direction;

the second ink head includes:

a second upstream nozzle array including a portion of the plurality of nozzles arrayed in the feeding direction; and a second downstream nozzle array including another portion of the plurality of nozzles arrayed in the feeding direction, the second downstream nozzle array being located downstream with respect to the second upstream nozzle array in the feeding direction;

the first printing controller:

in a case in which the first printing layer is to be formed below the second printing layer, causes the nozzles of the first upstream nozzle array to eject the first ink, and causes the nozzles of the second upstream nozzle array to eject the second ink to form the ink dots of the first dot group, to form the first printing layer; and in a case in which the first printing layer is to be formed above the second printing layer, causes the nozzles of the first downstream nozzle array to eject the first ink, and causes the nozzles of the second downstream nozzle array to eject the second ink to form the ink dots of the first dot group, to form the first printing layer; and the second printing controller:

in the case in which the first printing layer is to be formed below the second printing layer, causes the nozzles of the second downstream nozzle array to eject the second ink to form the ink dots of the second dot group, to form the second printing layer; and in the case in which the first printing layer is to be formed above the second printing layer, causes the nozzles of the second upstream nozzle array to eject the second ink to form the ink dots of the second dot group, to form the second printing layer.

* * * * *